(12) United States Patent
Shibutani et al.

(10) Patent No.: US 8,664,333 B2
(45) Date of Patent: Mar. 4, 2014

(54) ACETOACETIC ESTER GROUP-CONTAINING POLYVINYL ALCOHOL-BASED RESIN, RESIN COMPOSITION, AND USES THEREOF

(75) Inventors: Mitsuo Shibutani, Ibaraki (JP); Masahiro Saito, Ibaraki (JP)

(73) Assignee: The Nippon Synthetic Chemical Industry Co., Ltd., Osaka (JP)

( * ) Notice: Subject to any disclaimer, the term of this patent is extended or adjusted under 35 U.S.C. 154(b) by 1449 days.

(21) Appl. No.: 11/990,457

(22) PCT Filed: Aug. 18, 2006

(86) PCT No.: PCT/JP2006/316237
§ 371 (c)(1),
(2), (4) Date: Feb. 14, 2008

(87) PCT Pub. No.: WO2007/023741
PCT Pub. Date: Mar. 1, 2007

(65) Prior Publication Data
US 2009/0253865 A1    Oct. 8, 2009

(30) Foreign Application Priority Data
Aug. 22, 2005    (JP) .................................. 2005-239251

(51) Int. Cl.
*C08F 8/00*    (2006.01)

(52) U.S. Cl.
USPC ................. 525/61; 524/557; 525/56; 525/59; 525/60

(58) Field of Classification Search
USPC ........................ 525/56, 59, 60, 61; 524/557
See application file for complete search history.

(56) References Cited

FOREIGN PATENT DOCUMENTS

| JP | 55-094904 | | 7/1980 | | |
| JP | 55-137107 | | 10/1980 | | |
| JP | 57-040508 | | 3/1982 | | |
| JP | 5859263 | * | 4/1983 | ............. | C08L 29/04 |
| JP | 59217780 A | * | 12/1984 | ................ | C09J 3/16 |
| JP | 8-302141 | | 11/1996 | | |
| JP | 2000-178316 | | 6/2000 | | |
| JP | 2002-285117 | | 10/2002 | | |
| JP | 2002-356664 | | 12/2002 | | |
| JP | 2003-145918 | | 5/2003 | | |
| JP | 2004-291519 | | 10/2004 | | |
| JP | 2005-42036 | | 2/2005 | | |
| JP | 2005042036 | * | 2/2005 | ............ | C08F 261/04 |
| JP | 2005-120114 | | 5/2005 | | |
| JP | 2005-120115 | | 5/2005 | | |

* cited by examiner

*Primary Examiner* — James J Seidleck
*Assistant Examiner* — Marie Reddick
(74) *Attorney, Agent, or Firm* — Hamre, Schumann, Mueller & Larson, P.C.

(57) ABSTRACT

An object of the present invention is to provide a new acetoacetic ester group-containing polyvinyl alcohol-based resin that contains less amount of water-insoluble matter and is excellent in transparency and viscosity stability when converted into an aqueous solution, and that realizes excellent water resistance by combined use of a crosslinking agent. The invention provides an acetoacetic ester group-containing polyvinyl alcohol-based resin containing a structural unit represented by the general formula (1):

[Chem 1]

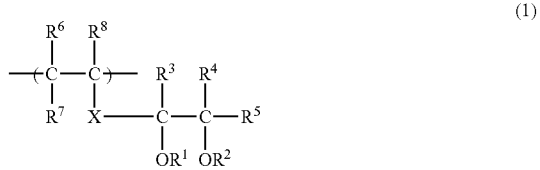

(1)

wherein at least one of $R^1$ and $R^2$ represents an acetoacetyl group, $R^3$, $R^4$, $R^5$, $R^6$, $R^7$ and $R^8$ each independently represents an arbitrary substituent, and X represents a single bond or an arbitrary bonding chain.

18 Claims, 4 Drawing Sheets

ACETOACETIC ESTER GROUP-CONTAINING POLYVINYL ALCOHOL-BASED RESIN, RESIN COMPOSITION, AND USES THEREOF

TECHNICAL FIELD

The present invention relates to an acetoacetic ester group-containing polyvinyl alcohol-based resin. More specifically, it relates to an acetoacetic ester group-containing polyvinyl alcohol-based resin that contains less amount of water-insoluble matter and is excellent in transparency and viscosity stability when converted into an aqueous solution, and that realizes good water resistance by combined use of a crosslinking agent, as well as an aqueous emulsion, an adhesive and a heat-sensitive recording medium, and an ink-jet recording medium, which contain the same.

BACKGROUND ART

Hitherto, polyvinyl alcohol-based resins (hereinafter abbreviated as PVA-based resins) have been widely used as materials for dispersants, emulsifiers, suspending agents, fiber processing agents, paper processing agents, binders, adhesives, films, and the like utilizing excellent water solubility, surface properties, adhesiveness, film properties (film-forming ability, strength, oil resistance, etc.). Furthermore, depending on functions required for various uses, modified PVA-based resins into which various functional groups are introduced have been developed. In particular, for improving water resistance which is a big problem for PVA-based resins, numerous modified PVA-based resins have been proposed.

For example, in the case of an acetoacetic ester group-containing PVA-based resin (hereinafter abbreviated as AA-PVA-based resin) wherein an acetoacetic ester group (hereinafter abbreviated as AA group) rich in reactivity is introduced into a side chain of the PVA-based resin, it is known that excellent water resistance is obtained by combined use of a crosslinking agent such as an aldehyde, an amine, or a metal.

As a process for producing such an AA-PVA-based resin, there is known a homogeneous reaction wherein a PVA-based resin is dispersed in acetic acid or is dissolved in an organic solvent such as dimethylformamide or dioxane beforehand and diketene is reacted therewith, but there is required tedious steps such as separation of a reaction product from the solution and solvent treatment and thus the process is economically disadvantageous at industrial production. Therefore, the present applicant has proposed, as convenient and inexpensive processes for producing such an AA-PVA-based resin, a process wherein liquid diketene or diketene gas is directly brought into contact with a PVA-based resin to effect a reaction therebetween (e.g., see Patent Documents 1 and 2) and a process wherein an organic acid is absorbed in a PVA-based resin and then the resulting resin is reacted with diketene (e.g., see Patent Document 3).

Moreover, since such an AA-PVA-based resin is rich in reactivity, viscosity of an aqueous solution thereof is apt to increase depending on storing conditions. As a solution to the problem, there has been proposed an AA-PVA-based resin composition containing specific amounts and specific ratio of an alkali metal acetate salt and acetic acid (e.g., see Patent Document 4).

Furthermore, as uses utilizing characteristic properties of such AA-PVA-based resins, there have been proposed a dispersant for emulsification comprising an AA-PVA-based resin having a block character of 0.6 or less and an average polymerization degree of 500 to 1500 (e.g., see Patent Document 5), a rapid curing adhesive comprising an aqueous liquid containing an AA-PVA-based resin having a block character of 0.3 to 0.6 and an aqueous liquid containing a specific crosslinking agent (honeymoon adhesive) (e.g., see Patent Document 6), a two component adhesive comprising a main agent containing an AA-PVA-based resin and an aqueous emulsion and a curing agent containing a specific amount of a multivalent isocyanate compound (e.g., see Patent Document 7), a heat-sensitive recording medium comprising a resin composition layer containing an AA-PVA-based resin and a cyclic acetal compound having a specific structure (e.g., see Patent Document 8), an ink-jet recording medium wherein an AA-PVA-based resin having a specified maximum value of loss tangent (tan δ) in viscoelasticity is used (e.g., see Patent Document 9), and the like.

Patent Document 1: JP-A-55-094904
Patent Document 2: JP-A-55-137107
Patent Document 3: JP-A-57-040508
Patent Document 4: JP-A-08-302141
Patent Document 5: JP-A-2000-178316
Patent Document 6: JP-A-2002-285117
Patent Document 7: JP-A-2002-356664
Patent Document 8: JP-A-2004-291519
Patent Document 9: JP-A-2003-145918

DISCLOSURE OF THE INVENTION

Problems that the Invention is to Solve

However, the processes for producing AA-PVA-based resins described in Patent Documents 1 to 3 are all heterogeneous reactions with diketene in a liquid, gaseous, or solution state and there is a risk that the content of the AA group in the molecule of the resulting AA-PVA-based resin is high in the surface layer of particles and low in the inside thereof. Therefore, there is a case where the molecules in the particle surface layer into which the AA group is excessively introduced may be self-crosslinked in the production steps to form a water-insoluble matter or cause a decrease in transparency of an aqueous solution. Moreover, there is a case where the molecules in the inside of the particles into which the AA group is not sufficiently introduced may not be incorporated into a network resulting from the reaction with the crosslinking agent and thus may be a cause of decrease in water resistance. Furthermore, when it is intended to increase the amount of the AA group to be introduced for the purpose of forming the network by crosslinking more rapidly and more extensively, the above problems become becomes more remarkable, so that it is limited to improve the characteristic properties such as water resistance.

Recently, in the case where a PVA-based resin is used as an aqueous solution, there is a tendency to use the resin in higher concentration for the purpose of reducing a drying load. However, the AA-PVA-based resins obtained by the production processes according to Patent Documents 1 to 3 have a problem that viscosity stability is not sufficient under severe conditions such as long-term storage under high concentration and high temperature conditions even when the technology described in Patent Document 4 is used.

Moreover, upon more detailed investigation on various uses using the AA-introduced PVA resins described in Patent Documents 5 to 9, an aqueous emulsion using the dispersant for emulsification described in Patent Document 5 is excellent in hot-water proof adhesion strength and possesses standing stability but there is a problem that a sufficient stability is not obtained under a high-temperature storage condition in summer when it is intended to increase the content of the AA group for the purpose of obtaining higher hot-water proof adhesion property. Furthermore, in the adhesive described in Patent Documents 6 and 7 and the heat-sensitive recording medium described in Patent Document 8, under the influence of the molecules into which the AA group is not sufficiently introduced, the formation of the network becomes insufficient, so that initial adhesion strength and hot-water proof adhesion strength in the adhesive and warm-water resistance and plasticizer resistance in the heat-sensitive recording medium become insufficient in some cases. In addition, the ink-jet recording medium described in Patent Document 9 has insufficient ink absorbability and glossiness and it is presumed that the insufficiency is attributable to the fact that the amount of the AA group introduced into the AA-PVA-based resin is not homogeneous among molecules. Namely, it was revealed that there is a plenty of room for improvement in all uses mentioned above.

Accordingly, it is desired to develop an AA-PVA-based resin that contains less amount of water-insoluble matter and is excellent in transparency and viscosity stability when converted into an aqueous solution, and that realizes excellent water resistance by combined use of a crosslinking agent and further an AA-PVA-based resin which realizes superior properties as a material for emulsifiers for emulsions, adhesives, heat-sensitive recording medium, and ink-jet recording medium.

Means for Solving the Problems

As a result of the extensive studies in consideration of such circumstances, the present inventors have found that the AA-introduced resin having a structural unit represented by the general formula (1) satisfies the above object, so that they have accomplished the present invention:

[Chem 1]

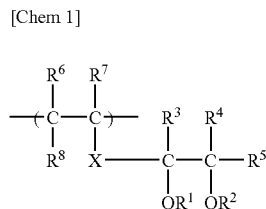
(1)

wherein $R^1$ and $R^2$ each represents a hydrogen atom or an acetoacetyl group and at least one thereof represents an acetoacetyl group; $R^3$, $R^4$, $R^5$, $R^6$, $R^7$ and $R^8$ each independently represents a hydrogen atom or an organic group; and X represents a single bond or a bonding chain.

Since an AA group is bonded to a side chain in the AA-containing PVA-based resin of the invention, viscosity stability is improved owing to easy inhibition of crystallization of the PVA-based resin in an aqueous solution by steric hindrance and also the AA group is apt to react with a crosslinking agent owing to its large freedom. As a result, it is considered that water resistance of the resulting crosslinked product is improved.

Moreover, since a 1,2-diol-modified PVA-based resin having a lower crystallinity as compared with conventional PVA-based resins, diketene satisfactorily diffuses into starting PVA particles during the AA-introducing reaction and hence the portion into which AA is excessively introduced is not present in the surface of the particles. Therefore, it is presumed that there is obtained an AA-PVA-based resin that contains less amount of water-insoluble matter and is excellent in transparency of an aqueous solution.

Advantage of the Invention

The AA-PVA-based resin of the invention contains less amount of water-insoluble matter, is excellent in transparency when converted into an aqueous solution, and is excellent in viscosity stability of the aqueous solution even under severe conditions such as high concentration, high temperature, and long term, and also water resistance is obtained by combined use of a crosslinking agent.

BEST MODE FOR CARRYING OUT THE INVENTION

Figure 1:
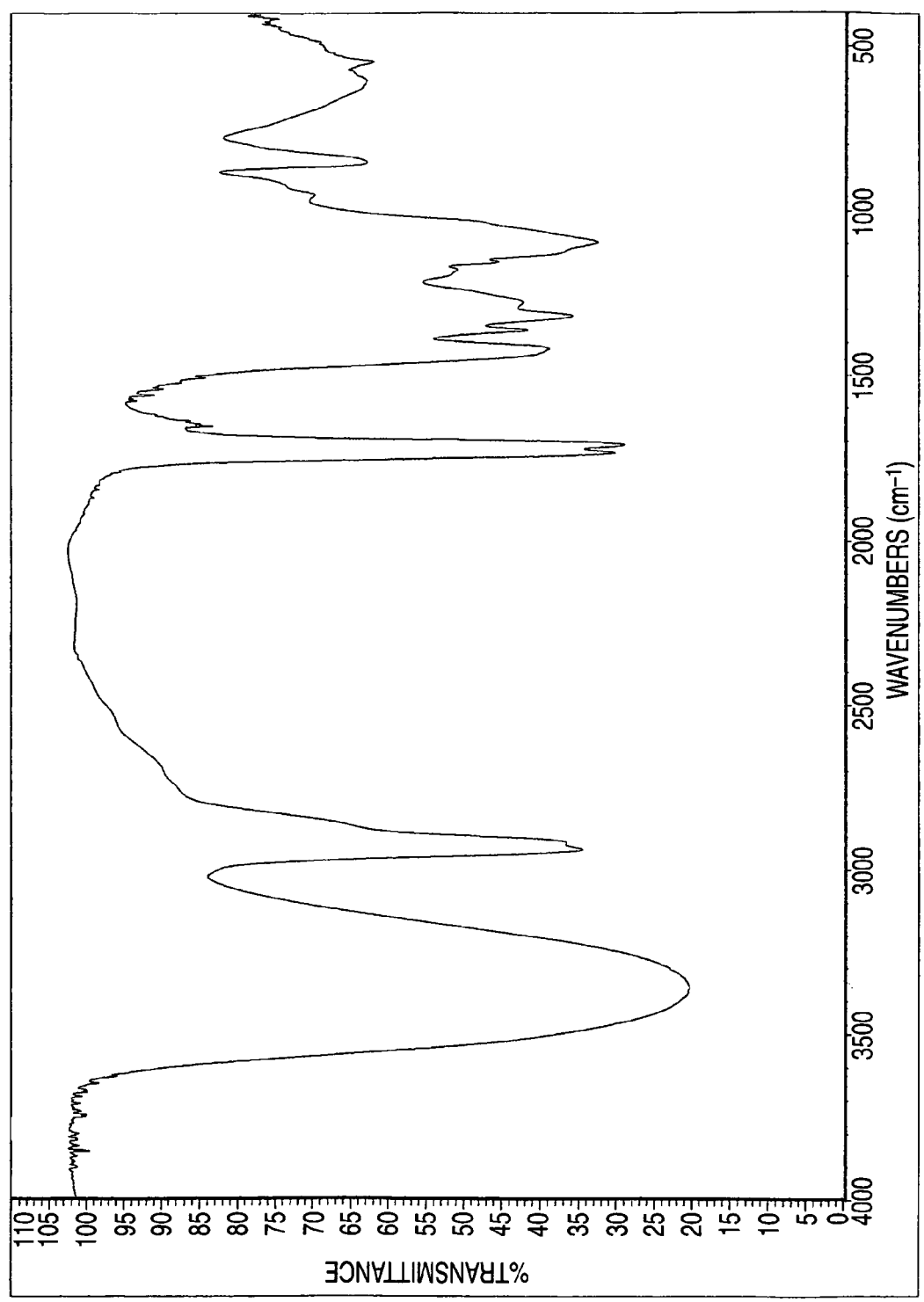
FIG. 1 is an IR spectrum chart of the AA-PVA-based resin (I).

The explanation of the compositional requirements described below is one example (representative example) of the embodiments of the present invention and the invention is not limited to the contents.

The following will describe the present invention in detail.

The AA-PVA-based resin of the invention is an AA-PVA-based resin having a structural unit represented by the general formula (1).

[Chem 2]

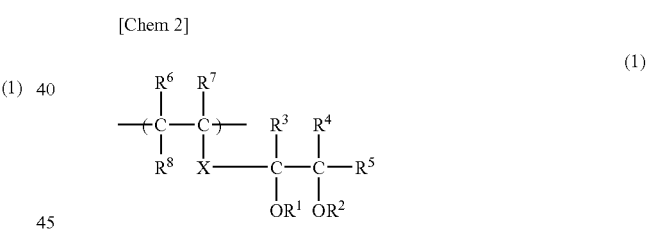
(1)

In the general formula (1), $R^1$ and $R^2$ each represents a hydrogen atom or an acetoacetyl group and at least one thereof represents an acetoacetyl group. Moreover, $R^3$, $R^4$, $R^5$, $R^6$, $R^7$, and $R^8$ each independently represents a hydrogen atom or an organic group. The organic group is not particularly limited but, for example, an alkyl group having 1 to 4 carbon atoms, such as a methyl group, an ethyl group, an n-propyl group, an isopropyl group, an n-butyl group, an isobutyl group, or a tert-butyl group, is preferred, which may have a substituent such as a halogen group, a hydroxyl group, an ester group, a carboxylic acid group, or a sulfonic acid group according to need.

Moreover, X represents a single bond or a bonding chain. The bonding chain is not particularly limited but there may be mentioned hydrocarbons such as alkylene, alkenylene, alkynylene, and also phenylene and naphthylene (where these hydrocarbons may be substituted with a halogen such as fluorine, chlorine, or bromine), as well as —O—, —$(CH_2O)_m$—, —$(OCH_2)_m$—, —$(CH_2O)_mCH_2$—, —CO—, —COCO—, —CO$(CH_2)_m$CO—, —CO$(C_6H_4)$CO—, —S—, —CS—, —SO—, —$SO_2$—, —NR—, —CONR—, —NRCO—, —CSNR—, —NRCS—, —NRNR—, —HPO$_4$—, —Si(OR)$_2$—, —OSi(OR)$_2$—, —OSi(OR)$_2$O—, —Ti(OR)$_2$—, —OTi(OR)$_2$—, —OTi(OR)$_2$O—, —Al(OR)—, —OAl(OR)—, —OAl(OR)O—, and the like (where R is each independently an arbitrary substituent, preferably a hydrogen atom or an alkyl group, and m is a natural number). Of these, in view of stability at the production and use, an alkylene group having 6 or less carbon atoms or —CH$_2$OCH$_2$— is preferred.

The AA-PVA-based resin of the invention contains the structural unit represented by the above general formula (1) but the content is usually from about 0.1 to 10% by mol. Moreover, in the general formula (1), a unit wherein $R^3$ to $R^8$ are all hydrogen atoms and X is a single bond is desired and a unit wherein the hydrogen atom may be replaced by such a substituent that the resin properties are not largely impaired.

Moreover, the AA-PVA-based resin of the invention has a structural unit represented by the general formula (1) and a structural unit represented by the general formula (2):

[Chem 3]

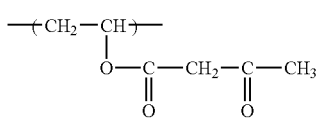

(2)

The process for producing such an AA-PVA-based resin is not particularly limited but a process for acetoacetic esterification of the hydroxyl group of a PVA-based resin having a 1,2-diol structural unit represented by the following general formula (3) (hereinafter, such a PVA-based resin is abbreviated as 1,2-diol-modified PVA-based resin) is preferred. For example, there may be mentioned a process for reacting a 1,2-diol-modified PVA-based resin with diketene, a process for reacting a 1,2-diol-modified PVA-based resin with an acetoacetic ester, and the like. Of these, from the viewpoint that the production process is simple and an AA-PVA-based resin having a good quality is obtained, the process for reacting a 1,2-diol-modified PVA-based resin with diketene is preferably used.

[Chem 4]

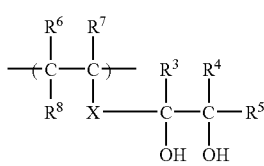

(3)

In the above general formula (3), $R^3$, $R^4$, $R^5$, $R^6$, $R^7$, $R^8$, and X are the same as in the above general formula (1).

As will be mentioned below, in the case where such a 1,2-diol-modified PVA-based resin is subjected to acetoacetic esterification with diketene, since the primary hydroxyl group in the side chain tends to be predominantly acetoacetylated as compared with the secondary hydroxyl group in the main or side chain, an AA-PVA-based resin having a structural unit wherein $R^1$ is a hydrogen atom and $R^2$ is an acetoacetyl group in the above general formula (1) is predominantly formed.

For obtaining the 1,2-diol-modified PVA-based resin, there are preferably used:

(i) a process for saponifying a copolymer of a vinyl ester-based monomer with a compound represented by the general formula (4):

[Chem 5]

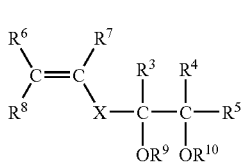

(4)

wherein $R^3$, $R^4$, $R^5$, $R^6$, $R^7$, and $R^8$ each independently represents a hydrogen atom or an organic group, X represents a single bond or a bonding chain, and $R^9$ and $R^{10}$ each independently represents a hydrogen atom or $R^{11}$—CO— (where $R^{11}$ is an alkyl group);

(ii) a process for saponifying and decarboxylating a copolymer of a vinyl ester-based monomer with a compound represented by the general formula (5):

[Chem 6]

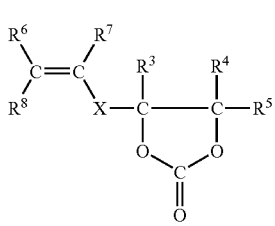

(5)

wherein $R^3$, $R^4$, $R^5R^6$, $R^7$, and $R^8$ each independently represents a hydrogen atom or an organic group, and X represents a single bond or a bonding chain;

(iii) a process of saponifying and deketalizating a copolymer of a vinyl ester-based monomer and a compound represented by the general formula (6):

[Chem 7]

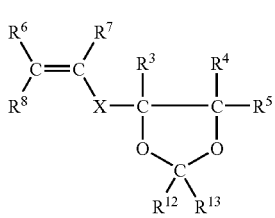

(6)

wherein $R^3$, $R^4$, $R^5$, $R^6$, $R^7$, $R^8$, $R^{12}$ and $R^{13}$ each independently represents a hydrogen atom or an organic group, and X represents a single bond or a bonding chain; and the like processes.

In this connection, as the vinyl ester-based monomer for use in the invention, there may be mentioned vinyl formate, vinyl acetate, vinyl propionate, vinyl valerate, vinyl butyrate, vinyl isobutyrate, vinyl pivalate, vinyl caprate, vinyl laurate, vinyl stearate, vinyl benzoate, vinyl varsatate, and the like. From the economical viewpoint, of these, vinyl acetate is preferably used.

The following will explain the processes (i), (ii), and (iii).
[Process (i)]

In the compound represented by the above general formula (4) for use in the invention, $R^3$, $R^4$, $R^5$, $R^6$, $R^7$, $R^8$, and X are the same as in the above general formula (1) and $R^9$ and $R^{10}$ each independently represents a hydrogen atom or $R^{11}$—CO— (where $R^{11}$ is an alkyl group, preferably a methyl group, a propyl group, a butyl group, a hexyl group, or an octyl group and such an alkyl group may have a substituent such as a halogen group, a hydroxyl group, an ester group, a carboxylic group, or a sulfonic acid group according to need).

As the compound represented by the formula (4), there may be specifically mentioned 3,4-dihydroxy-1-butene, 3,4-diacyloxy-1-butene, 3-acyloxy-4-hydroxy-1-butene, 4-acyloxy-3-hydroxy-1-butene, 3,4-diacyloxy-2-methyl-1-butene, 4,5-dihydroxy-1-pentene, 4,5-diacyloxy-1-pentene, 4,5-dihydroxy-3-methyl-1-pentene, 4,5-diacyloxy-3-methyl-1-pentene, 5,6-dihydroxy-1-hexene, and 5,6-diacyloxy-1-hexene where X is a single bond or an alkylene group; glycerin monoallyl ether, 2,3-diacetoxy-1-allyloxypropane, 2-acetoxy-1-allyloxy-3-hydroxypropane, 3-acetoxy-1-allyloxy-2-hydroxypropane, glycerin monovinyl ether, and glycerin monoisopropenyl ether wherein X is —CH$_2$OCH$_2$— or —OCH$_2$—; and the like. Of these, in view of excellent copolymerization reactivity and industrial handling, 3,4-diacyloxy-1-butene where $R^3$, $R^4$, $R^5$, $R^6$, $R^7$, and $R^8$ are all hydrogen, X is a single bond, $R^9$ and $R^{10}$ each is $R^{11}$—CO—, and $R^{11}$ is an alkyl group is preferred. In particular, 3,4-diacetoxy-1-butene where $R^{11}$ is a methyl group, or glycerin monoallyl ether where $R^3$, $R^4$, $R^5$, $R^6$, $R^7$, and $R^8$ are all hydrogen, X is —CH$_2$OCH$_2$—, and $R^9$ and $R^{10}$ each is hydrogen is preferred.

With regard to 3,4-diacetoxy-1-butene, a product of Eastman Chemical Company is commercially available for industrial production and a product of Across Company for reagent level one. Moreover, 3,4-diacetoxy-1-butene obtained as a by-product during 1,4-butanediol production can be utilized.

In addition, the compound can be obtained utilizing known technologies such as a process for converting 1,4-diacetoxy-2-butene into 3,4-diacetoxy-1-butene as described in JP-A-10-212264 and a process for obtaining 3,4-diacetoxybutene from 1,3-butadiene via a monoepoxide as described in WO00/24702.

In the copolymerization of such a vinyl ester-based monomer with the compound represented by the general formula (4), known processes such as bulk polymerization, solution polymerization, suspension polymerization, dispersion polymerization, or emulsion polymerization can be employed without particular limitation but usually, solution polymerization is carried out.

The method for charging monomer components in the polymerization is not particularly limited and any method such as lump-sum charging, divided charging, or successive charging may be employed. In view of homogeneous distribution of the structural unit derived from the compound represented by the general formula (4) in the molecular chain of the polyvinyl ester-based polymer, dropwise polymerization is preferred and particularly, a polymerization process based on HANNA process is preferred.

The dropwise polymerization is a process for polymerization under continuous or non-continuous dropwise addition of any one or both of monomers in order to maintain a monomer ratio in the reaction system within a certain range during the copolymerization. In particular, a process wherein the monomer(s) is added dropwise at a rate comparable to the consuming rate of the monomer(s) calculated based on the reactivity ratio of the both monomers to maintain the monomer ratio in the system is dropwise polymerization by the HANNA process.

As the solvent for use in such a copolymerization, there may be usually mentioned lower alcohols such as methanol, ethanol, isopropyl alcohol, n-propanol, and butanol, ketones such as acetone and methyl ethyl ketone, and the like. Industrially, methanol is suitably used.

The amount of the solvent to be used may be suitably selected according to the polymerization degree of the objective copolymer in consideration of the chain transfer constant of the solvent. For example, when the solvent is methanol, the amount is selected from the range of S (solvent)/M (monomer)=0.01 to 10 (weight ratio), preferably 0.05 to 3 (weight ratio).

In the copolymerization, a polymerization catalyst is used. As such a polymerization catalyst, there may be, for example, mentioned known radical polymerization catalysts such as azobisisobutyronitrile, acetyl peroxide, benzoyl peroxide, and lauryl peroxide, low-temperature active radical polymerization catalysts such as azobisdimethylvaleronitrile and azobismethoxydimethylvaleronitrile, and the like. The amount of the polymerization catalyst to be used varies depending on the kind of the comonomer and the kind of the catalyst and is not categorically determined but is arbitrarily selected depending on the polymerization rate. For example, in the case of using azobisisobutyronitrile or acetyl peroxide, the amount thereof is preferably from 0.01 to 0.7% by mol, particularly preferably from 0.02 to 0.5% by mol based on the vinyl ester-based monomer.

Moreover, the reaction temperature for carrying out the copolymerization is from 30° C. to boiling point depending on the solvent and pressure used, and more specifically in the range of 35 to 150° C., preferably 40 to 75° C.

The resulting copolymer is then saponified. In such saponification, the copolymer obtained above is dissolved in a solvent such as an alcohol and the saponification is carried out using an alkali catalyst or an acid catalyst. As a representative solvent, there may be mentioned methanol, ethanol, propanol, and tert-butanol but methanol is particularly preferably used. The concentration of the copolymer in the alcohol is suitably selected depending on the viscosity of the system but is usually selected from the range of 10 to 60% by weight. As the catalyst for use in the saponification, there may be mentioned alkali catalysts such as hydroxides and alcoholates of alkali metals including sodium hydroxide, potassium hydroxide, sodium methylate, sodium ethylate, potassium methylate, and lithium methylate and acid catalysts such as sulfuric acid, hydrochloric acid, nitric acid, methanesulfonic acid, zeolite, and cation-exchange resins.

The amount of such a saponification catalyst to be used is suitably selected depending on the saponification method, objective saponification degree, and the like but, in the case of using an alkali catalyst, the amount is suitably from 0.1 to 30 mmol, preferably from 2 to 17 mmol per mol of the total amount of the structural units derived from the vinyl ester-based monomer and the compound represented by the formula (4).

Moreover, the reaction temperature of the saponification is not particularly limited but is preferably from 10 to 60° C., preferably 20 to 50° C.

[Process (ii)]

In the compound represented by the above general formula (5) for use in the invention, $R^3$, $R^4$, $R^5$, $R^6$, $R^7$, $R^8$, and X are the same as in the above general formula (1). Of these, in view of easy availability and good copolymerizability, vinylethylene carbonate where $R^3$, $R^4$, $R^5$, $R^6$, $R^7$, and $R^8$ each represents a hydrogen atom and X represents a single bond is suitably used.

The copolymerization of the vinyl ester-based monomer with the compound represented by the general formula (5) and saponification thereof are carried out as in the above process (i).

The reaction temperature of the copolymerization depends on the solvent used but is preferably from about 40° C. to boiling point, and the reaction temperature of the saponification is preferably from 10 to 150° C., more preferably from 10 to 60° C., particularly preferably 20 to 50° C.

With regard to decarboxylation, usually the decarboxylation is carried out together with the saponification under the above saponification conditions without particular treatment after the saponification and the ring opening of the ethylene carbonate ring results in the conversion into 1,2-diol structure.

Moreover, it is possible to carry out the decarboxylation under a certain pressure (normal pressure to $1 \times 10^7$ Pa) and a high temperature (50 to 200° C.) without saponification of the vinyl ester portion. In such a case, the above saponification can be carried out after decarboxylation.

[Process (iii)]

In the compound represented by the above general formula (6) for use in the invention, $R^3$, $R^4$, $R^5$, $R^6$, $R^7$, $R^8$, and X are the same as in the above general formula (1) and $R^{12}$ and $R^{13}$ each independently represents a hydrogen atom or an alkyl group. The alkyl group is not particularly limited but, for example, is preferably an alkyl group having 1 to 4 carbon atoms, such as a methyl group, an ethyl group, an n-propyl group, an isopropyl group, an n-butyl group, an isobutyl group, or a tert-butyl group. Such an alkyl group may have a substituent such as a halogen group, a hydroxyl group, an ester group, a carboxylic acid group, or a sulfonic acid group according to need. Of these, in view of easy availability and good copolymerizability, 2,2-dimethyl-4-vinyl-1,3-dioxolane where $R^3$, $R^4$, $R^5$, $R^6$, $R^7$, and $R^8$ each represents a hydrogen atom and $R^{12}$ and $R^{13}$ each represents a methyl group is suitable.

The copolymerization of the vinyl ester-based monomer with the compound represented by the general formula (6) and saponification thereof are carried out as in the above process (i).

Moreover, the reaction temperature of the copolymerization depends on the solvent used but is preferably from about 40° C. to boiling point, and the reaction temperature of the saponification is preferably from 10 to 150° C., more preferably from 10 to 60° C., particularly preferably 20 to 50° C.

With regard to deketalization of the saponified product of the above copolymer, in the case where the above saponification is carried out with an alkali catalyst, the deketalization is carried out with an acid catalyst in an aqueous solvent (water, a mixed solvent such as water/acetone or water/a lower alcohol such as methanol, etc.) after the saponification to result in the conversion into the 1,2-diol structure. As the acid catalyst for use in the deketalization, there may be mentioned acetic acid, hydrochloric acid, sulfuric acid, nitric acid, methanesulfonic acid, zeolite, cation-exchange resins, and the like.

Moreover, in the case where the above saponification is carried out with an acid catalyst, usually deketalization is carried out together with the saponification under the above saponification conditions without particular treatment after the saponification to result in the conversion into the 1,2-diol structure.

In the 1,2-diol-modified PVA-based resin for use in the invention, the copolymerization can be carried out using the other unsaturated monomer as a copolymerizable component in a range where the object of the invention is not inhibited. As the unsaturated monomer, there may be, for example, mentioned olefins such as α-olefins including ethylene, propylene, isobutylene, α-octene, α-dodecene, and α-octadecene; unsaturated acids such as acrylic acid, methacrylic acid, crotonic acid, maleic acid, maleic anhydride, and itaconic acid or salts thereof or mono- or di-alkyl ester thereof; nitriles such as acrylonitrile and methacrylonitrile; amides such as diacetoneacrylamide, acrylamide, and methacrylamide; olefinsulfonic acids such as ethylenesulfonic acid, allylsulfonic acid, and methacrylsulfonic acid or salts thereof; alkyl vinyl ethers, dimethylallyl vinyl ketone, N-vinylpyrrolidone, vinyl chloride, vinylidene chloride; polyoxyalkylene (meth)allyl ether such as polyoxyethylene (meth)allyl ether and polyoxypropylene (meth)allyl ether; polyoxyalkylene (meth)acrylate such as polyoxyethylene (meth)acrylate and polyoxypropylene (meth)acrylate; polyoxyalkylene(meth)acrylamide such as polyoxyethylene(meth)acrylamide and polyoxypropylene (meth)acrylamide; polyoxyethylene(1-(meth)acrylamido-1, 1-diemethylpropyl)ester, polyoxyethylene vinyl ether, polyoxypropylene vinyl ether, polyoxyethyleneallylamine, polyoxypropyleneallylamine, polyoxyethylenevinylamine, polyoxypropylenevinylamine, and the like.

Furthermore, there may be also mentioned N-cationic group-containing monomers such as N-acrylamidomethyl-trimethylammonium chloride, N-acrylamidoethyl-trimethylammonium chloride, N-acrylamidopropyl-trimethylammonium chloride, 2-acryloxyethyltrimethylammonium chloride, 2-methacryloxyethyltrimethylammonium chloride, 2-hydroxy-3-methacryloxypropyltrimethylammonium chloride, allyltrimethylammonium chloride, methallyltrimethylammonium chloride, 3-butenetrimethylammonium chloride, dimethyldiallylammonium chloride, and diethyldiallylammonium chloride; acetoacetyl group-containing monomers; isopropenyl acetate, 1-methoxyvinyl acetate, 1,4-diacetoxy-2-butene, vinylene carbonate, and the like. Also, it is possible to use those wherein a 1,2-diol bond is introduced in an amount of about 1.6 to 3.5% by mol in the PVA main chain by making the polymerization temperature 100° C. or higher.

The saponification degree of the 1,2-diol-modified PVA-based resin thus obtained is preferably from 65 to 100% by mol, more preferably from 80 to 99.7% by mol, particularly preferably 90 to 99.5% by mol. When such a saponification degree is too low, water solubility of the AA-PVA-based resin after the AA-introduction reaction sometimes becomes insufficient, so that the case is not preferred.

Moreover, the average polymerization degree (measured in accordance with JIS K6726) of the 1,2-diol-modified PVA-based resin is preferably from 150 to 4000, more preferably from 200 to 3000, particularly preferably from 250 to 2500. When such an average polymerization degree is too small, water resistance and film strength sometimes decrease in various uses using the AA-PVA-based resin. Contrarily, when the degree is too large, the introduction of the 1,2-diol component sufficient to obtain characteristic properties of the AA-PVA-based resin of the invention becomes difficult and the viscosity in the form of an aqueous solution sometimes becomes too high to handle. Thus, the cases are not preferred.

Furthermore, the content of the 1,2-diol structural unit in the 1,2-diol-modified PVA-based resin is preferably from 0.1 to 20% by mol, more preferably from 0.5 to 15% by mol, particularly preferably from 1 to 10% by mol. When such content is too low, improvement of transparency of the aqueous solution and improvement of water resistance which are advantages of the invention are not sufficiently exhibited in some cases. Contrarily, when the content is too high, the polymerization degree of the PVA-based resin becomes too low at the production. Thus, the cases are not preferred.

The 1,2-diol-modified PVA-based resin thus obtained is acetoacetylated in the hydroxyl group by the reaction with diketene to form the AA-PVA-based resin of the invention. In such a reaction, it is possible to dissolve 1,2-diol-modified PVA homogeneously in a solvent such as DMSO and react it with a predetermined amount of diketene in the co-presence of a salt such as sodium acetate as a catalyst at 60° C. to 120° C. but industrially, a heterogeneous reaction as shown in the following is preferred wherein 1,2-diol-modified PVA powder is reacted with gaseous or liquid diketene.

In this connection, it is confirmed in the course of accomplishing the invention that the reactivity of diketene toward the primary hydroxyl group in the 1,2-diol-modified PVA-based resin is about 120 times higher than that of the secondary hydroxyl group in the aforementioned heterogeneous reaction and thus there is a tendency that the primary hydroxyl group in the 1,2-diol structure of the side chain is predominantly converted into the AA group as compared with the secondary hydroxyl group of the main chain.

Moreover, in such a 1,2-diol-modified PVA-based resin, since the primary hydroxyl group having a high reactivity is homogeneously present only in amorphous portion, it is possible in the homogeneous reaction system to predominantly convert the primary hydroxyl group in the 1,2-diol structure of the side chain into the AA group even under the reaction conditions where the amount of the organic acid to be adsorbed and included into the starting resin powder is reduced or the acid is not employed, a solvent which is hardly adsorbed or included is used instead of the organic acid, or the organic acid or the like is hardly adsorbed or included by lowering the reaction temperature.

Such a 1,2-diol-modified PVA-based resin is preferably a powder, particularly narrow in particle distribution, and porous, since such a resin contributes occurrence of homogeneous reaction through homogeneous adsorption and absorption of diketene and improvement of the reaction ratio of diketene. The particle size is preferably from 7 mesh pass to 450 mesh on, more preferably from 10 mesh pass to 450 mesh on, particularly preferably 10 mesh pass to 320 mesh on toward JIS standard sieves.

Moreover, the 1,2-diol-modified PVA-based resin sometimes contains an alcohol, an ester, and water during the production steps in several % and these components react with diketene to consume diketene and lower the reaction ratio of diketene, so that it is desirable to use the resin after reducing the content of the components as far as possible by heating or pressure-reducing operation at the reaction.

As the method of reacting the 1,2-diol-modified PVA-based resin with diketene, the PVA-based resin may be directly reacted with gaseous or liquid diketene or a method of spraying and reacting liquid or gaseous diketene under an inert gas atmosphere after an organic acid is adsorbed or included into the PVA-based resin powder beforehand or a method of spraying a mixture of an organic acid and liquid diketene to the 1,2-diol-modified PVA-based resin powder and effecting the reaction is employed.

In the method using an organic acid, acetic acid is most advantageous as the organic acid but the acid is not limited thereto and propionic acid, butyric acid, isobutyric acid, and the like is arbitrarily used.

The amount of the organic acid is preferably such an amount that the acid can be adsorbed or included by the 1,2-diol-modified PVA-based resin powder in the reaction system, in other words, such an amount that the organic acid separated from the resin in the reaction system is not present and it is necessary to determine the amount to be added in consideration of the modified degree or the crystallization degree of the PVA-based resin. Specifically, it is suitable that the organic acid is co-present in an amount of 0.1 to 80 parts by weight, preferably 0.5 to 50 parts by weight, particularly preferably 5 to 20 parts by weight based on 100 parts by weight of the PVA-based resin. When the amount of the organic acid is too small, the effect of co-presence of the organic acid is hardly obtained. On the other hand, when the organic acid is present excessively, it is necessary to use a large amount of a washing solvent for removing the organic acid after the reaction and thus the case is not economical.

For homogeneous adsorption and inclusion of the organic acid into the 1,2-diol-modified PVA-based resin, it is possible to carry out any means such as a method of spraying the organic acid alone to the PVA-based resin or a method of dissolving the organic acid in a suitable solvent and spraying it.

As the conditions for the reaction of the 1,2-diol-modified PVA-based resin with diketene, in the case where liquid diketene is homogeneously adsorbed or absorbed to the PVA-based resin powder by means of spraying or the like, it is preferred to continue stirring or a fluidized state under heating at a temperature of 20 to 120° C. under an inert gas atmosphere for a determined period of time.

Moreover, in the case of the reaction with diketene gas, the contact temperature is from 30 to 250° C., preferably from 50 to 200° C. and the contact is preferably carried out under such conditions of temperature and diketene partial pressure that gaseous diketene is not liquefied at the contact with the 1,2-diol-modified PVA-based resin but the transformation of part of the gas into liquid drops results in no trouble.

The contact time may depend on the contact temperature, that is, the time may be longer when the temperature is low and the time may be shorter when the temperature is high, and the time is suitably selected from the range of 1 minute to 6 hours.

In the case of feeding diketene gas, it may be diketene gas itself or a mixed gas of diketene gas and an inert gas. The temperature may be elevated after the gas is absorbed to the 1,2-diol-modified PVA-based resin but it is preferred to bring the gas into contact therewith after heating.

As a catalyst for such a reaction, a basic compound such as sodium acetate, potassium acetate, a primary amine, a secondary amine, or a tertiary amine is effective and the amount thereof is from 0.1 to 3.0% by weight based on the 1,2-diol-modified PVA-based resin. In this connection, the PVA-based resin usually contains sodium acetate as a by-product in the production and thus it is possible to utilize it. Moreover, when the amount of the catalyst is too large, a side reaction of diketene tends to occur and hence the case is not preferred.

Furthermore, as a reaction apparatus, any apparatus capable of being heated and fitted with a stirrer may be used. For example, there may be mentioned a kneader, Henschel mixer, a ribbon blender, the other various blenders, and a stirring and drying apparatus.

The AA-PVA-based resin of the invention thus obtained is a PVA-based resin having a structural unit represented by the general formula (1) and usually has, in addition to such a structural unit, a structural unit represented by the general formula (2) wherein the hydroxyl group bonded to the main chain is converted into AA and a structural unit represented by the general formula (3) wherein the 1,2-diol-modified portion is remained without being converted into AA. The composition ratio of these structural units is usually as follows: the structural unit represented by the general formula (1) is from about 0.1 to 10% by mol of the total structural units excluding the vinyl acetate structural unit, the structural unit represented by the general formula (2) is from about 0 to 5% by mol of the total structural units, and the structural unit represented by the general formula (3) is from about 0.1 to 20% by mol.

In this connection, the total acetoacetic ester group content (hereinafter abbreviated as AA-introduced degree) in such an AA-PVA-based resin is preferably from 0.1 to 25% by mol, more preferably from 0.3 to 20% by mol, particularly preferably from 0.5 to 15% by mol. When the AA-introduced degree is too small, water resistance of the AA-PVA-based resin becomes insufficient. Contrarily, when the degree is excessive, insoluble matter increases and transparency of the aqueous solution becomes worse in some cases. Thus, both cases are not preferred.

Such an AA-introduced degree represents the ratio (% by mol) of the AA group to all vinyl structural units in the AA-PVA-based resin. Specifically, the degree can be determined by the ratio of the peak area derived from the methyl proton of the AA group to the peak area derived from the methylene proton of the main chain in $^1$H-NMR spectrum.

Moreover, in the AA-PVA-based resin of the invention, it is preferred to contain an alkali metal acetate salt and acetic acid so that the value represented by the following equation (7) is from −2.27 to 1.75, more preferably from −1.17 to 0.85 and the content of the alkali metal is more preferably 0.5% by weight or less, particularly 0.1% by weight or less. When such a value is less than the lower limit or when the value exceeds the upper limit, insoluble matter may occur or transparency of the aqueous solution may decrease when the resin is dissolved and also increase in viscosity may be caused when the resin is stored for a long period of time in an aqueous solution state in some cases, so that both cases are not preferred:

log [([acetate salt]×molecular weight of acetic acid)/ ([acetic acid]×molecular weight of acetate salt)]   [7]

wherein [acetate salt] represents the content (% by weight) of the acetate salt and [acetic acid] represents the content (% by weight) of acetic acid.

In this connection, the above content of the alkali metal acetate salt is quantitatively determined by analyzing a solution containing ash matter dissolved in an aqueous hydrochloric acid solution by an atomic absorption method and the content of acetic acid is quantitatively determined by a gas chromatography/mass spectrometry (GC/MS method).

The method of controlling the contents of the alkali metal acetate salt and acetic acid in the AA-PVA-based resin is not particularly limited but there may be mentioned a method of controlling the amount of the alkali catalyst at saponification in the production of the 1,2-diol-modified PVA-based resin as a bulk powder and a method of adding or removing the alkali metal acetate salt and acetic acid after the PVA-based resin production.

Moreover, during or after the production of the AA-PVA-based resin, the alkali metal acetate salt and acetic acid may be added or removed. In this connection, a method of removing the alkali metal acetate salt and acetic acid, which have been produced as a by-product or used in the production steps, after the production of the AA-PVA-based resin is industrially practical. Specifically, washing with an alcohol or the like method is employed. As the alcohol, there may be mentioned methanol, ethanol, n-propanol, isopropanol, or the like and particularly, methanol is preferably used. For the washing with an alcohol, 1 to 1.5 equivalent weight of the alcohol based on the AA-PVA-based resin is usually used and washing may be carried out once to three times at a temperature range of 5 to 60° C. for 0.5 to 2 hours per one washing.

Moreover, for removing acetic acid from the AA-PVA-based resin, there may be mentioned evaporation under reduced pressure and methods of washing with methanol, drying treatment, filtration, centrifugation, and the like. These treatments may be combined simultaneously or separately but drying treatment is preferably employed. The conditions for the drying treatment vary depending on the apparatus but the treatment may be carried out at 30 to 80° C. for 5 to 10 hours, preferably at 40 to 70° C. for 3 to 6 hours.

In the invention, by adjusting pH of a 4% by weight aqueous solution of such an AA-PVA-based resin to 3 to 6.5, preferably 4 to 5, stability of the aqueous solution is further improved.

The method of controlling the pH is not particularly limited and there may be, for example, mentioned a method of controlling the amount of the alkali catalyst in the production of the bulk powder 1,2-diol-modified PVA-based resin, a method of adding acetic acid after the PVA production, and a method of removing it.

Moreover, according to need, the pH may be controlled by adding a mineral acid such as hydrochloric acid, sulfuric acid, or phosphoric acid or an organic acid such as propionic acid or maleic acid or sodium hydroxide, potassium hydroxide, a primary amine, a secondary amine, a tertiary amine, or a quaternary ammonium salt.

Furthermore, without limitation to the bulk powder treatment, such pH adjustment as above may be carried out during or after the production of the AA-PVA-based resin and industrially, a method of removing acetic acid after the production of the AA-PVA-based resin is practical.

The thus obtained AA-PVA-based resin of the invention contains less amount of water-insoluble matter insoluble and excellent in transparency and viscosity stability when converted into an aqueous solution, and a film excellent in water resistance is obtained. Moreover, further excellent water resistance is obtained by the use thereof as a resin composition wherein such an AA-PVA-based resin is used in combination with a crosslinking agent.

As such a crosslinking agent, there may be, for example, mentioned multivalent metal compounds, boron compounds, amine compounds, hydrazine compounds, silane compounds, methylol group-containing compounds, aldehyde group-containing compounds, epoxy compounds, thiol compounds, isocyanate compounds, polyamide resins, and the like. In particular, multivalent metal compounds, aldehyde group-containing compounds, amine compounds, hydrazine compounds, and isocyanate compounds are suitable.

Such multivalent metal compounds are compounds containing an aluminum atom, a zinc atom, an iron atom, a zirconium atom, a titanium atom, a gallium atom, an indium atom, a ruthenium atom, or a hafnium atom, and particularly, compounds having a zirconium atom are suitable.

Such compounds having a zirconium atom may be any of simple salts and complex salts of inorganic acids or organic acids, organometallic compounds, metal complexes, oxidized compounds (zirconyl compounds), and the like. As specific examples, there may be mentioned zirconium fluoride, zirconium chloride, zirconium bromide, zirconic acid, zirconate salts, zirconyl chloride ("Zircosol ZC" manufactured by Daiichi Kigenso Kagaku Kogyo Co., Ltd.), basic zirconyl chloride ("Zircosol ZC-2" manufactured by Daiichi Kigenso Kagaku Kogyo Co., Ltd.), zirconyl sulfate, zirconyl nitrate ("Zircosol ZN" manufactured by Daiichi Kigenso Kagaku Kogyo Co., Ltd.), zirconyl carbonate, zirconium ammonium carbonate ("Zircosol AC-7" manufactured by Daiichi Kigenso Kagaku Kogyo Co., Ltd.), zirconium potassium carbonate ("Zircosol ZK-10" manufactured by Daiichi Kigenso Kagaku Kogyo Co., Ltd.), zirconyl acetate, zirconyl stearate, zirconyl octylate, zirconyl citrate, zirconyl lactate, zirconyl oxalate, zirconyl phosphate, zirconium tetraacetylacetonate ("Orgatics ZC-150" manufactured by Matsumoto Seiyaku Kogyo Sha), zirconium monoacetylacetonate ("Orgatics ZC-540" manufactured by Matsumoto Seiyaku Kogyo Sha), zirconium bisacetylacetonate ("Orgatics ZC-550" Manufactured by matsumoto Seiyaku Kogyo Sha), zirconium monoethylacetonate ("Orgatics ZC-560" manufactured by Matsumoto Seiyaku Kogyo Sha), zirconium acetate ("Orgatics ZC-115" manufactured by Matsumoto Seiyaku Kogyo Sha), and the like.

Of these compounds containing a zirconium atom, zirconium ammonium carbonate, zirconium potassium carbonate, zirconyl compounds such as zirconyl acetate, basic zirconyl chloride, acidic zirconyl chloride, and zirconyl nitrate are preferred and particularly, basic zirconyl chloride and zirconyl nitrate are suitably used since the object of the invention is remarkably exhibited.

As such aldehyde group-containing compounds, there may be mentioned monoaldehydes such as formaldehyde, acetaldehyde, propionaldehyde, crotonaldehyde, and benzaldehyde, glyoxal, glutaraldehyde, malonodialdehyde, terephthalaldehyde, dialdehyde starch, and the like. Of these, glyoxal is suitably used.

As such hydrazine compounds, there may be mentioned hydrazine, salts of hydrazine with inorganic acids such as hydrochloric acid, sulfuric acid, nitric acid, sulfurous acid, phosphoric acid, thiocyanic acid, or carbonic acid, and salts thereof with organic acids such as formic acid and oxalic acid; hydrazine derivatives such as monosubstituted derivatives of hydrazine with methyl, ethyl, propyl, butyl, allyl, and the like and symmetrically disubstituted derivatives thereof with 1,1-dimethyl, 1,1-diethyl, and the like; hydrazide compounds such as carbohydrazide, oxalodihydazide, malonodihydrazide, glutarodihydrazide, succinodihydrazide, adipodihydrazide, azelaodihydrazide, sebacodihydrazide, dodecanediodihydrazide, maleodihydrazide, fumarodihydrazide, diglycolodihydrazide, tartarodihydrazide, malodihydrazide, isophthalodihydrazide, terephthalodihydrazide, citrodihydrazide, 1,3-bis(hydrazinocarbonoethyl)-5-isopropylhydantoin ("Amicure VDH" manufactured by Ajinomoto Fine Techno Co., Ltd. etc.), 7,11-octadecadiene-1,18-dicarbohydrazide ("Amicure UDH" manufactured by Ajinomoto Fine Techno Co., Ltd. etc.), polyacrylohydrazide, N-aminopolyacrylamide, and N-aminoacrylamide/acrylamide copolymers; and the like. Particularly, multivalent hydrazide compounds such as adipodihydrazide, 1,3-bis(hydrazinocarbonoethyl)-5-isopropylhydantoin, N-aminopolyacrylamide, and N-aminoacrylamide/acrylamide copolymers are suitably used since the object of the invention is remarkably exhibited.

As such amine compounds, there may be mentioned aliphatic polyamines such as ethylenediamine, hexamethylenediamine, diethylenetriamine, dipropylenetriamine, triethylenetetramine, tetraethylenepentamine, N-aminoethylpiperazine, bisaminopropylpiperazine, trimethylhexamethylenediamine, and polyoxypropylenediamine; alicyclic polyamine such as 3,3'-dimethyl-4,4'-diaminodicyclohexylmethane, 4,4'-diaminodicyclohexylmethane, isophoronediamine, 1,3-bisaminomethylcyclohexane, and norbornanediamine; aromatic diamines such as 4,4'-diaminodiphenylmethane, 4,4'-diaminodiphenyl ether, diaminodiphenyl sulfone, m-phenylenediamine, 2,4'-toluoylenediamine, and m-xylylenediamine, amino group-containing water-soluble polymers such as amino group-modified PVA-based resins, polyvinylamine, polyallylamine, and polyethyleneimine. Particularly, 1,3-bisaminomethylcyclohexane, m-phenylenediamine, amino group-modified PVA-based resins, and polyethyleneimine are suitably used since the object of the invention is remarkably exhibited.

The content of the aforementioned crosslinking agent relative to the AA-PVA-based resin of the invention is not particularly limited but is preferably from 0.1 to 50 parts by weight, more preferably from 0.5 to 20 parts by weight, particularly preferably from 1 to 10 parts by weight based on 100 parts by weight of the AA-PVA-based resin in terms of solid matter. When the content is too low, the crosslinking effect with the AA-introduced PVA is not exhibited. When the content is too high, workability decreases, reaction efficiency does not increase, and water resistance becomes worse in some cases. Thus, both cases are not preferred.

The thus obtained AA-PVA-based resin of the invention is useful in various uses such as emulsifiers, suspending agents, adhesives, binders, coating agents, paper processing agents, and moldings. Particularly, an aqueous emulsion, an adhesive, a heat-sensitive recording medium, and an ink-jet recording medium using the AA-PVA-based resin are specifically explained.

First, the aqueous emulsion using the AA-PVA-based resin of the invention as an emulsifier is described.

As production processes of such an aqueous emulsion, there may be mentioned 1) a process for emulsion polymerization of monomer(s) using the AA-PVA-based resin as an emulsifier or a protective colloid, 2) a process for post emulsification of a solution or a melt liquid of a synthetic resin in the presence of the AA-PVA-based resin, 3) a process for producing a more stable aqueous emulsion by post-addition of the AA-PVA-based resin to a synthetic resin emulsion obtained by any method, and the like processes. The following will specifically describe these processes but the production process is not limited to the processes.

1) Process by Emulsion Polymerization

There may be carried out a usual emulsion polymerization method wherein an ethylenically unsaturated monomer and/or diene-based monomer were added at once or continuously in the presence of water, the AA-PVA-based resin, and a polymerization catalyst and then the whole is heated and stirred or an emulsion polymerization method wherein a dispersion (pre-emulsion) obtained by mixing and dispersing an ethylenically unsaturated monomer and/or diene-based monomer in an aqueous solution of the AA-PVA-based resin was added at once or continuously in the presence of water, the AA-PVA-based resin, and a polymerization catalyst and then the whole is heated and stirred.

As such ethylenically unsaturated monomer and diene-based monomer, monomers frequently used in emulsion polymerization are mainly mentioned. As representative monomers, there may be mentioned vinyl ester-based monomers, acrylic acid or its ester-based monomers, diene-based monomers, olefin-based monomers, acrylamide-based monomers, acrylonitrile-based monomers, styrene-based monomers, vinyl ether-based monomers, allyl-based monomers, and the like.

There may be mentioned vinyl formate, vinyl acetate, vinyl propionate, vinyl valerate, vinyl butyrate, vinyl isobutyrate, vinyl pivalate, vinyl caprate, vinyl laurate, vinyl stearate, vinyl benzoate, vinyl versatate, 1-methoxyvinyl acetate, isoprepenyl acetate, and the like as the vinyl ester-based monomers; methyl (meth)acrylate, ethyl (meth)acrylate, n-propyl (meth)acrylate, i-propyl (meth)acrylate, n-butyl (meth)acrylate, i-butyl (meth)acrylate, t-butyl (meth)acrylate, 2-ethylhexyl (meth)acrylate, dodecyl (meth)acrylate, octadecyl (meth)acrylate, (meth)acrylic acid, and the like as the acrylic acid or its ester-based monomers; and 1,3-butadiene, 2-methyl-1,3-butadiene, 2,3-dimethyl-1,3-butadiene, 2-chloro-1, 3-butadiene, and the like as the diene-based monomers.

Furthermore, there may be mentioned olefin-based monomers such as ethylene, propylene, 1-butene, and isobutene and halogenated olefins such as vinylidene chloride, vinyl fluoride, and vinylidene fluoride as the olefin-based monomers; (meth)acrylamide, N-methylolacrylamide, N,N-dimethylacrylamide, acrylamide-2-methylpropanesulfonic acid, diacetoneacrylamide, and the like as the acrylamide-based monomers; (meth)acrylonitrile and the like as acrylonitile-based monomers; styrene, α-methylstyrene, and the like as the styrene-based monomers; methyl vinyl ether, n-propyl vinyl ether, i-propyl vinyl ether, n-butyl vinyl ether, i-butyl vinyl ether, t-butyl vinyl ether, dodecyl vinyl ether, stearyl vinyl ether, and the like as the vinyl ethers; and allyl acetate, allyl chloride, and the like as the allyl monomers.

Moreover, in addition to the above, there may be mentioned carboxyl group-containing compounds and esters thereof such as fumalic acid, maleic acid (anhydride), itaconic acid (anhydride), and trimellitic anhydride; sulfonic acid group-containing compounds such as ethylenesulfonic acid, allylsulfonic acid, methallylsulfonic acid, and 2-acrylamido-2-methylpropanesulfonic acid; vinylsilane compounds such as vinyltrimethoxysilane; and further isopropenyl acetate, 3-(meth)acrylamidopropyltrimethylammonium chloride, and the like.

Of the above compounds, in consideration of alkali resistance of the aqueous emulsion, (meth)acrylic acid or its ester-based monomers, syrene-based monomers, and butadiene-based monomers are preferred.

The above ethylenically unsaturated monomers and diene-based monomers can be used singly for polymerization but two or more thereof can be used in combination (copolymerization).

In the case of using the resin in such a use, the saponification degree of the AA-PVA-based resin of the invention is preferably from 80 to 100% by mol, more preferably from 85 to 99.8% by mol, particularly preferably from 87 to 99.5% by mol. The average polymerization degree is preferably from 150 to 4000, more preferably 200 to 3000, particularly preferably from 250 to 2500 and the AA-introduction degree is preferably from 0.1 to 25% by mol, more preferably from 0.2 to 20% by mol, particularly preferably from 0.3 to 15% by mol.

The amount of the AA-PVA-based resin to be used slightly varies depending on the kind and the resin content in the aqueous emulsion but usually, is preferably from 0.1 to 30% by weight, more preferably from 1 to 25% by weight, particularly preferably from 2 to 20% by weight based on the whole emulsion polymerization reaction system. When the amount is too small, it becomes difficult to maintain the polymer particles in a stable emulsified state. Contrarily, when the amount is too large, the emulsion viscosity excessively increases and thus workability decreases and/or water resistance lowers. Thus, both cases are not preferred.

As the polymerization initiator, usually, potassium persulfate, ammonium persulfate, potassium bromate, and the like are used each singly or in combination with acidic sodium sulfite and further, water-soluble redox system polymerization initiators such as hydrogen peroxide-tartaric acid, hydrogen peroxide-iron salt, hydrogen peroxide-ascorbic acid-iron salt, hydrogen peroxide-Rongalit, and hydrogen peroxide-Rongalit-iron salt are used. Specifically, catalysts consisting of organic peroxides and redox systems, such as "Kayabutyl B" manufactured by Kayaku Akzo Corporation and "Kayabutyl A-50C" manufactured by Kayaku Akzo Corporation can be also employed.

The method of adding the polymerization initiator is not particularly limited and there may be employed a method of simultaneous addition at the beginning, a method of continuous addition in the progress of polymerization, and the like.

In the above emulsion polymerization, a water-soluble polymer or a nonionic or anionic surfactant can be used as a dispersion stabilizer in combination.

As the water-soluble polymer, there may be mentioned, an unmodified PVA other than the above AA-PVA-based resin, a carboxyl group-containing PVA, formalized, acetalized, butyralized, urethanized, esterified (sulfonic acid, carboxylic acid, etc.), acetoacetylated, diacetoneacrylamidated products of PVA, ethylene oxide-modified products, and saponified products of copolymers of vinyl esters with monomers copolymerizable therewith, and the like. As the monomers copolymerizable with vinyl esters, there may be mentioned olefins such as ethylene, butylene, isobutylene, α-octene, α-dodecene, α-octadecene; unsaturated acids such as acrylic acid, methacrylic acid, crotonic acid, maleic acid, maleic anhydride, and itaconic acid or salts or mono- or dialkyl esters thereof; nitriles such as acrylonitrile and methacrylonitrile; amides such as acrylamide, diacetoneacrylamide, and methacrylamide; olefinsulfonic acid such as ethylenesulfonic acid, allylsulfonic acid, and methallylsulfonic acid or salts thereof; alkyl vinyl ethers, vinyl ketones, N-vinylpyrrolidone, vinyl chloride, vinylidene chloride, and the like.

Moreover, as the water-soluble polymers other than the above PVA-based resins, there may be mentioned cellulose derivatives such as methylcellulose, ethylcellulose, hydroxymethylcellulose, hydroxypropyl methylcellulose, hydroxybutyl methylcellulose, hydroxyethylcellulose, carboxymethylcellulose, aminomethyl hydroxypropylcellulose, and aminoethyl hydroxypropylcellulose, starch, tragacanth, pectin, glue, alginic acid or salts thereof, gelatin, polyvinylpyrrolidone, polyacrylic acid or salts thereof, polymethacrylic acid or salts thereof, polyacrylamide, polymethacrylamide, copolymers of vinyl acetate with unsaturated acids such as maleic acid, maleic anhydride, acrylic acid, acrylic acid, methacrylic acid, itaconic acid, fumaric acid, and crotonic acid, copolymers of styrene with the above unsaturated acids, copolymers of vinyl ethers with the above unsaturated acids, and salts or esters of the above copolymers.

As the nonionic surfactants, there may be, for example, mentioned polyoxyethylene-alkyl ether type, polyoxyethylene-alkylphenol type, polyoxyethylene-polyhydric alcohol ester type, esters of polyhydric alcohols with aliphatic acids, oxyethylene-oxypropylene block polymers, and the like.

As the anionic surfactants, there may be, for example, mentioned higher alcohol sulfates, higher fatty acid alkali salts, polyoxyethylene-alkylphenol-ether sulfate salts, alkylbenzenesulfonate salts, naphthalenesulfonate salt formalin condensates, alkyldiphenyl-ether-sulfonate salts, dialkylsulfosuccinate salts, higher alcohol phosphonate esters, and the like.

Furthermore, plasticizers such as phthalate esters and phosphate esters, pH adjustors such as sodium carbonate, sodium acetate, and sodium phosphate, and the like may be used in combination.

Moreover, for the purpose of further improving polymerization stability and mechanical strength of the aqueous emulsion, a water-soluble polymerization inhibitor is preferably co-present in an amount of 10 to 500 ppm, more preferably 10 to 200 ppm using the AA-PVA-based resin as an emulsifier.

Such a water-soluble polymerization inhibitor is not particularly limited but there may be, for example, mentioned thiocyanate salts, nitrite salts, water-soluble sulfur-containing organic compounds, and the like and, as the thiocyanate salts, there may be mentioned ammonium thiocyanate, zinc thiocyanate, sodium thiocyanate, potassium thiocyanate, aluminum thiocyanate, and the like. As the nitrite salts, there may be mentioned sodium nitrite, potassium nitrite, ammonium nitrite, calcium nitrite, silver nitrite, strontium nitrite, cesium nitrite, barium nitrite, magnesium nitrite, lithium nitrite, dicyclohexylammonium nitrite, and the like. As the water-soluble sulfur-containing organic compounds, there may be mentioned hydroxyl group-substituted mercaptans such as mercaptoethanol, monothiopropylene glycol, and thioglycerol; mercaptocarboxylic acids such as thioglycolic acid, thiohydroacrylic acid, thiolactic acid, and thiomalic acid; amino-substituted mercaptans such as thioethanolamine; nitro-substituted mercaptans such as $\beta$-nitroethylmercaptan; hydroxyl group-substituted divalent mercaptans such as 1,2-dithioglycerol and 1,3-dithioglycerol; dimercaptoketones such as 1,3-dimercaptoacetone; dimercaptocarboxylic acids such as $\beta,\beta$-dithioisobutyric acid; hydroxyl group-substituted sulfides such as thioglycol; hydroxyl group-substituted sulfides such as thiodiglycol; sulfide carboxylic acids such as thiodiglycolic acid, $\beta,\beta$-thiodipropionic acid, and thiodilactic acid; aldehyde-substituted sulfides such as $\beta$-methylthiopropionaldehyde; amino-substituted sulfides such as $\beta$-aminoethyl sulfide; nitro-substituted sulfides such as $\beta$-nitroethyl sulfide; mercapto-substituted sulfides such as $\beta$-mercaptoethyl sulfide; and the like. The timing for addition of the water-soluble polymerization inhibitor is preferably at the time when the polymerization conversion rate of the monomer is in the range of 5 to 75%. When it is added at the time earlier than the time when the conversion rate becomes 5%, dispersion of the polymerization system becomes insufficient and hence coarse particles increase in the resulting aqueous emulsion. Moreover, when it is added after the time when the polymerization conversion rate reaches 75%, the case is not preferred in view of suppression of formation of the coarse particles in the aqueous emulsion and improving effect on mechanical stability.

The polymerization initiator to be used at the addition of the water-soluble polymerization inhibitor is preferably oil-soluble and use thereof after being dissolved in the monomer is further preferred since the formation of the coarse particles can be suppressed.

Such an oil-soluble polymerization initiator is not particularly limited but there may be, for example, mentioned peroxydicarbonates such as diisopropyl peroxydicarbonate, di-2-ethylhexyl peroxydicarbonate, and diethoxyethyl peroxydicarbonate; peroxy ester compounds such as t-butyl peroxyneodecanate and $\alpha$-cumyl peroxyneodecanate; peroxides such as acetylcyclohexylsulfonyl peroxide; azo compounds such as azobisisobutyronitrile, azobis-2,4-dimethylvaleronitrile, azobis(4-methoxy-2,4-dimethylvaleronitrile); and the like.

If necessary, any of nonionic surfactants such as polyoxyethylene-alkyl ether type, polyoxyethylene-alkylphenol type, and polyhydric alcohol ester type or cationic surfactants such as higher alkylamine salts and also various surfactants used in the emulsion polymerization mentioned above can be used in combination. Moreover, it is possible to mix these surfactants in the substance to be emulsified. Furthermore, pH adjustors such as phthalate esters, sodium acetate, and sodium phosphate can be used in combination.

2) Process by Post Emulsification

At the production of the aqueous emulsion by post emulsification process, it is suitable that the AA-PVA-based resin of the invention is dissolved in water, a polymer of an ethylenically unsaturated monomer and/or a diene-based monomer in a solution form is added dropwise thereto, and finally the whole is stirred or alternatively, the aqueous solution of the AA-PVA-based resin is added dropwise to the polymer in a solution form and then the whole is stirred. For the emulsification, heating or the like is not particularly necessary but, if necessary, it is suitable to heat the whole at about 45 to 85° C. As the substance to be emulsified, other than the aforementioned polymer of an ethylenically unsaturated monomer and/or a diene-based monomer, there may be mentioned epoxy resins, urethane resins, urea-formalin initial condensates, phenol-formaldehyde initial condensates, alkyd resins, ketene dimer, rosin, silicon resins, wax, polypropylene, polyethylene, asphalt, and the like.

In the case of use in such a use, the saponification degree of the AA-PVA-based resin of the invention is preferably from 65 to 99.9% by mol, more preferably from 70 to 99.8% by mol, particularly preferably from 80 to 99.5% by mol. The average polymerization degree is preferably from 150 to 4000, more preferably 200 to 3000, particularly preferably from 250 to 2500 and the AA-introduction degree is preferably from 0.5 to 25% by mol, more preferably from 1 to 20% by mol, particularly preferably from 2 to 15% by mol. The amount thereof to be used is in the range of about 0.5 to 50% by weight, more preferably about 1 to 30% by weight based on the solid matter in the aqueous emulsion.

If necessary, any of nonionic surfactants such as polyoxyethylene-alkyl ether type, polyoxyethylene-alkylphenol type, and polyhydric alcohol ester type or cationic surfactants such as higher alkylamine salts and also various surfactants used in the above emulsion polymerization can be used in combination. Moreover, it is possible to mix these surfactants in the substance to be emulsified. Furthermore, pH adjustors such as phthalate esters, sodium acetate, and sodium phosphate can be used in combination.

3) Process by Post-Addition

The process includes the addition of the AA-PVA-based resin to the synthetic resin emulsion obtained by any method. As the emulsions to be treated, there may be mentioned styrene/butadiene-based emulsions, cis-1,4-polyisoprene emulsions, chloroprene emulsions, acrylonitrile/butadiene emulsions, vinylpyridine emulsions, methyl methacrylate/butadiene emulsions, polyurethane emulsions, acryl ester-based emulsions, vinyl acetate-based emulsions, ethylene/vinyl acetate-based emulsions, vinyl chloride-based emulsions, polystyrene emulsions, polyethylene emulsions, silicon emulsions, polybutene emulsions, thiocol emulsions, and the like.

In the case where the AA-PVA-based resin is added to the aqueous emulsion, when the PVA is added after it is converted into an aqueous solution, the aqueous solution may be only added to the aqueous emulsion at room temperature with stirring. However, in the case where a powder of the PVA resin is added, homogeneous mixing is finished within a short period of time when the powder is added with stirring of the aqueous emulsion and then the whole is heated to 50 to 85° C., so that the operations are preferred.

In the case of use in such a use, the saponification degree of the AA-PVA-based resin of the invention is preferably from 65 to 99.9% by mol, more preferably from 70 to 99.8% by mol, particularly preferably from 80 to 99.5% by mol. The average polymerization degree is preferably from 150 to 4000, more preferably 200 to 3000, particularly preferably from 250 to 2500 and the AA-introduction degree is preferably from 0.5 to 25% by mol, more preferably from 1 to 20% by mol, particularly preferably from 2 to 15% by mol. The amount thereof to be used is in the range of about 1 to 50% by weight, more preferably about 2 to 30% by weight based on the solid matter in the aqueous emulsion.

The thus obtained aqueous emulsion may be suitably mixed with additives according to various uses, such as a crosslinking agent, a water proofing agent, a pigment, a dispersant, a deforming agent, an oil agent, a viscosity modifier, a tackifier, a thickener, a water proofing agent, a textile softener, a smoother, and an antistatic agent, according to need. As such a crosslinking agent, aforementioned various crosslinking agents can be used.

Such an aqueous emulsion is excellent in water resistance and can be suitably used in cement mortar admixtures, cement mortar coatings, civil engineering materials, paints, adhesives, pressure-sensitive adhesives, fiber processing agents, paper processing agents, inorganic binders, modifiers of resins such as vinyl chloride, fixing stabilizers of viscous soil such as sludge and industrial waste, re-releasable coverings for surface protection, cosmetic uses, and the like. Of these, particularly utilizing the mechanical stability thereof, it is suitably used in cement mortar admixtures, cement mortar coatings, civil engineering materials, paints, and the like.

Moreover, it is also possible to remove water in the aqueous emulsion of the invention to form a re-dispersible synthetic resin powder. Such a method of removing water is not particularly limited and there can be mentioned spray drying, heat drying, blow drying, freeze drying, drying by pulse shock wave, and the like methods. Industrially, spray drying is suitably carried out.

For the spray drying, there can be used a usual spray drying machine in which a liquid is dried with spraying. Depending on the type of spraying, disc type, nozzle type, and the like are mentioned but any type is employed. As a heat source, hot air, heated steam, or the like is used.

The drying conditions are suitably selected depending on the size and kind of the spray drier, the concentration, viscosity, and flow rate of the aqueous emulsion, and the like. The drying temperature is suitably from 80° C. to 150° C. When the drying temperature is lower than 80° C., sufficient drying is not effected. When the temperature exceeds 150° C., degradation of the polymer by heat occurs. Thus, both cases are not preferred. The temperature is more preferably from 100 to 140° C.

Moreover, since there is a risk that the re-dispersible synthetic resin powder aggregates through caking of the powder itself during its storage to form blocks, it is preferred to use anti-caking agent in order to improve storage stability. The anti-caking agent may be added to the emulsion powder after spray drying and homogeneously mixed but it is preferred to spray the aqueous emulsion in the presence of the anti-caking agent at the time when the aqueous emulsion is spray-dried, in view of homogeneous mixing and in view of caking inhibition effect. It is particularly preferred to spray and dry both substances simultaneously.

As the anti-caking agent, an inorganic powder in a fine particle form is preferred and there may be mentioned calcium carbonate, clay, silicic anhydride, aluminum silicate, white carbon, talc, alumina white, and the like. In particular, silicic anhydride, aluminum silicate, calcium carbonate, and the like having an average particle size of about 0.01 to 0.5 μm are preferred. The amount of the anti-caking agent to be used is not particularly limited but is preferably from 2 to 20% by weight based on the emulsion powder.

Thus, the re-dispersible synthetic resin powder is obtained and the powder is easily re-emulsified by adding the powder into water and stirring the whole and then the resulting emulsion can be used in the same manner as the aqueous emulsion. The re-dispersed emulsion also exhibits high mechanical stability.

Such a re-dispersed synthetic resin powder is also useful in cement mortar admixtures, cement mortar coatings, civil engineering materials, paints, adhesives, pressure-sensitive adhesives, fiber processing agents, paper processing agents, inorganic binders, cosmetic uses, and the like. Particularly, the re-dispersed synthetic resin powder of the invention is very useful as cement mortar admixtures.

The following will describe an adhesive containing the AA-PVA-based resin of the invention.

Such an AA-PVA-based resin can be used in various adhesives such as remoisterable adhesives, hot-melt adhesives, pressure-sensitive adhesives, rapid curing adhesives (honeymoon adhesives), and two component adhesives. In particular, as uses utilizing the excellent water resistance obtained by combined use of the crosslinking agent which is a characteristic of the AA-PVA-based resin of the invention, rapid curing adhesives (honeymoon adhesives) and two component adhesives may be mentioned.

First, in the case of the use as the rapid curing adhesives (honeymoon adhesives), it is suitable to use an aqueous liquid containing the AA-PVA-based resin of the invention as Liquid A and an aqueous liquid containing a curing agent as Liquid B. In the case of the use in such a use, the saponification degree of the AA-PVA-based resin of the invention is preferably from 65 to 100% by mol, more preferably from 80 to 99.8% by mol, particularly preferably from 85 to 99.5% by mol. The average polymerization degree is preferably from 150 to 4000, more preferably 200 to 3000, particularly preferably from 250 to 250 and the AA-introduction degree is preferably from 1 to 25% by mol, more preferably from 2 to 20% by mol, particularly preferably from 3 to 15% by mol.

Moreover, as the Liquid A, various aqueous emulsions obtained by the aforementioned method can be also used and particularly, an aqueous emulsion using vinyl acetate, BA/MMA, or the like as a substance to be dispersed, SBR latex, or the like is preferably used.

The solid matter in such Liquid A is preferably in an amount of 2 to 50% by weight in the case of the aqueous AA-PVA-based resin solution and 1 to 10% by weight in the case of the aqueous emulsion.

Furthermore, as the curing agent to be contained in the Liquid B, aforementioned various crosslinking agents can be used but particularly, hydrazine compounds, polymer hydrazides, amine compounds, dialdehyde compounds, polyamide resins, silane compounds, and zirconium compounds are suitable.

The content of the curing agent in such Liquid B is preferably from 1 to 50% by weight, more preferably 2 to 40% by weight, particularly preferably from 3 to 30% by weight. When the content is too low, the advantages of the invention are sometimes not sufficiently obtained. Contrarily, even when it is too high, the advantages are not remarkably improved. Thus, both cases are not preferred.

To the Liquid A are added, according to need, a water-soluble polymer such as the other PVA-based resin or starch, a crosslinking agent such as a multivalent metal, an isocyanate, and an amino resin, a plasticizer, a film-forming auxiliary such as a high-boiling solvent, an extender such as calcium carbonate and clay, a colored pigment such as titanium oxide, an antiseptic, a bug repellent, a defoaming agent, a thickener, an antirust, and the like, thereby the above Liquid A being formed. Also, to the Liquid B are added, according to need, a cure accelerator such as an amine, an alcohol, and an acid, an antilust such as lecithin or lanoline, an antiseptic, a thickener, and the like in addition to the above compounds.

Thus, the quickly curable aqueous adhesive comprising the Liquid A and the Liquid B as mentioned above is obtained. Such a quickly curable aqueous adhesive is usually used by coating the Liquid A and the Liquid B separately onto articles to be adhered.

Namely, the Liquid A is coated on the surface of a substrate to be adhered, e.g., a wood surface, and the Liquid B is coated on the surface of another substrate to be adhered. Immediately, both surfaces are placed face-to-face, brought into contact with each other, and pressured. Then, since they are adhered with considerable strength at room temperature within several seconds to 10 minutes, the pressure can be released and, upon standing and aging without further operation, an adhered article having a sufficiently high adhesion strength is obtained.

Since such a quickly curable aqueous adhesive is excellent in normal-state adhesion strength (particularly, initial adhesion strength) and hot-water proof adhesion strength, it is useful in high-speed adhesion of fibrous materials such as wood, plywood, particle board, and hard board, inorganic materials such as slate board, calcium silicate board, mortar, and tiles, plastic materials such as melamine decorative board, bakelite, and polystyrene foam, paper materials such as cardboard, paper board, kraft paper, and the like.

Moreover, the two component adhesive using the AA-PVA-based resin of the invention comprises a main agent consisting of an aqueous liquid containing the AA-PVA-based resin and an aqueous emulsion and a curing agent containing a multivalent isocyanate compound and is used with mixing such main agent and curing agent before use.

As the aqueous emulsion for use in the main agent of the two component adhesive of the invention, there may be specifically mentioned vinyl acetate homopolymer, emulsions of copolymers of vinyl acetate with acrylic acid, maleic acid, fumaric acid, or crotonic acid and esters thereof, styrene-butadiene copolymer latexes, ethylene-vinyl acetate copolymer emulsions, α,β-unsaturated carboxylic acid-containing ethylene-vinyl acetate copolymer emulsions, butadiene-acrylonitrile copolymer latexes, chloroprene latexes, Butyl-rubber latexes, polybutadiene latexes, polyvinyl chloride emulsions, polyvinylidene chloride emulsions, and the like. Of these, styrene-butadiene copolymer latexes and ethylene-vinyl acetate copolymer emulsions are preferably used. Moreover, the aqueous emulsion may be any of aforementioned various aqueous emulsions using the AA-PVA-based resin of the invention as an emulsifier.

The content of the aqueous emulsion in the main agent in the two component adhesive of the invention is not particularly limited but a ratio of AA-PVA-based resin/aqueous emulsion is preferably from 99/1 to 5/95, more preferably from 95/5 to 10/90, particularly from 90/10 to 15/85 (parts by weight) in terms of solid matter. When the weight ratio falls without the aforementioned range, cohesive force and water resistance of the adhesive layer decreases in all cases.

Moreover, as the multivalent isocyanate compound for use in the curing agent of the two component adhesive of the invention, there may be mentioned aromatic, aliphatic, cycloaliphatic, or alicyclic polyisocyanates or mixtures thereof. Of these, there may be specifically mentioned tolylene diisocyanates (TDI) such as 2,4-tolylene diisocyanate or 2,6-tolylene diisocyanate and mixtures thereof; aromatic polyisocyanates such as diphenylmethane diisocyanate (MDI), hydrogenated diphenylmethane diisocyanate (H-MDI), polyphenylmethane polyisocyanate (crude MDI), modified diphenylmethane diisocyanate (modified MDI), hydrogenated xylylene diisocyanate (H-XDI), trimethylolpropane-TDI adduct, xylylene diisocyanate (XDI), 4,4-dicyclohexylmethane diisocyanate, hexamethylene diisocyanate (HMDI), and trimethylhexamethylene diisocyanate (TMXDI) or trimer compounds of these polyisocyanates; aliphatic polyisocyanates such as isophorone diisocyanate (IPDI); norbornene diisocyanate (NBDI), reaction products of these polyisocyanates with polyols; and the like. Diphenylmethane diisocyanate (MDI) and 2,4-tolylene diisocyanate (TDI) are suitably used.

As the mixing ratio of the main agent and the curing agent in the two component adhesive of the invention, a ratio of main agent/curing agent is preferably from 99/1 to 30/70, more preferably from 90/10 to 45/55, particularly from 75/25 to 60/40 (weight ratio) in terms of solid matter. When the weight ratio is too large, adhesion strength and water resistance decrease. When the ratio is too small, pot life is shortened and hence workability decreases and voids may be formed in the adhesive layer by foaming. Thus, both cases are not preferred.

In the two component adhesive of the invention, as an extender, there may be further used wheat flour, starch, defatted soybean, clay, kaolin, talc, calcium carbonate, titanium oxide, and the like. The mixing amount of the extender varies depending on the intended purpose but is, generally, preferably 200 parts by weight or less, more preferably 150 parts by weight or less based on 100 parts by weight (in terms of solid matter) of the aqueous emulsion.

Moreover, to the two component adhesive of the invention may be suitably further added an antifreezing agent such as ethylene glycol or propylene glycol, a dispersing auxiliary such as a nonionic surfactant, a defoaming agent, an antiseptic, a fungicide, a coloring agent, a solvent, a thickener, or the like.

The two component adhesive of the invention is excellent in normal-state adhesion strength and hot-water proof adhesion strength and particularly, is suitable as wood/wood adhesives (plywood adhesives, wood adhesives, particle board adhesives, etc.), wood/plastic material adhesives (PVC plywood adhesives, resin foam/wood adhesives, etc.), and the like. Furthermore, it can be used as packaging adhesives (paper/paper adhesives, paper/plastic adhesives, paper/aluminum foil adhesives, etc.), fabric adhesives (fabric/plastic adhesives, fabric/paper adhesives, fabric/wood adhesives, etc.), and building material adhesives (concrete/wood adhesives, wood/various boards adhesives, etc.).

The following will describe a heat-sensitive recording medium having a layer containing the AA-PVA-based resin of the invention.

The heat-sensitive recording medium of the invention contains the AA-PVA-based resin of the invention and a crosslinking agent in the heat-sensitive coloring layer and/or the protective layer on the supporting substrate or contains the AA-PVA-based resin in the protective layer and the crosslinking agent in the heat-sensitive coloring layer. Also, as such a crosslinking agent, the aforementioned crosslinking agent can be used.

In the case of the use in such a use, the saponification degree of the AA-PVA-based resin of the invention is preferably from 65 to 99.9% by mol, more preferably from 75 to 99.8% by mol, particularly preferably from 80 to 99.5% by mol. The average polymerization degree is preferably from 150 to 4000, more preferably 200 to 3000, particularly preferably from 250 to 2500 and the AA-introduction degree is preferably from 0.3 to 25% by mol, more preferably from 0.5 to 20% by mol, particularly preferably from 1 to 15% by mol.

The content of the crosslinking agent based on the AA-PVA-based resin in such a use is not particularly limited but is preferably 0.1 to 50 parts by weight, more preferably 0.5 to 20 parts by weight, particularly 1 to 10 parts by weight based on 100 parts by weight of the AA-PVA-based resin in terms of solid matter.

In this connection, the supporting substrate for use in the heat-sensitive recording medium of the invention is not particularly limited and there may be used paper (hardboard such as manila board, white board, or liner, printing paper such as common wood free paper, medium-quality paper, or gravure paper, superior, medium, or inferior paper, news print paper, release paper, carbon paper, non-carbon paper, glassine paper, artificial paper, etc.), non-woven fabric, plastic film (polyester film, Nylon film, polyolefin film, polyvinyl chloride film, and laminates thereof, etc.), or composite sheets thereof like synthetic resin laminate paper.

The following will describe each layer of them.

The heat-sensitive coloring layer can be formed by coating an aqueous coating solution containing a leuco dye, a developer, and a binder resin on the supporting substrate. In the invention, as such a binder resin, the AA-PVA-based resin of the invention and a crosslinking agent are used. The mixing amount of the AA-PVA-based resin on this occasion is suitably from 10 to 200% by weight based on the total amount of the leuco dye and the developer.

As examples of the above leuco dye, there may be mentioned triarylmethane-based compounds such as 3,3-bis(p-dimethylaminophenyl)-phthalide, 3,3-bis(p-dimethylaminophenyl)-6-dimethylaminophthalide [Crystal Violet lactone], 3,3-bis(p-dimethylaminophenyl)phthalide, and 3-(p-dimethylaminophenyl)-3-(1,2-dimethylindol-3-yl)phthalide, diphenylmethane-based compounds such as 4,4'-bis (dimethylaminophenyl)benzhydril benzyl ether and N-chlorophenyl leucoauramine, xanthene-based compounds such as rhodamine B anilinolactam, rhodamine B-p-chloroanilinolactam, and 3-diethylamino-7-dibenzylaminofluoran, thiazine-based compounds such as benzoylleuco methylene blue and p-nitrobenzoylleuco methylene blue, spiro-based compounds such as 3-methylspironaphthopyran and 3-ethylspirodinaphthopyran, and the like. Also, these leuco dyes can be used singly or as a mixture of two or more thereof.

Moreover, the developer causes color development through reaction with the above leuco dye under heating and there may be, for example, mentioned phenol, p-methylphenol, p-tert-butylphenol, p-phenylphenol, α-naphthol, β-naphthol, 4,4'-isopropylidenediphenol [bisphenol A], 4,4'-sec-butylidenediphenol, 4,4'-cyclohexylidenediphenol, 4,4'-isopropylidenebis(2-tert-butylphenol), 4,4'-(1-methyl-n-hexylidene)diphenol, 4,4'-isopropylidenedicatecol, 4,4'-benzylidenediphenol, 4,4-isopropylidenebis(2-chlorophenol), phenyl-4-hydroxybenzoate, salicylic acid, 3-phenylsalicylic acid, 5-methylsalicylic acid, 3,5-di-tert-butylsalicylic acid, 1-oxy-2-naphthoic acid, m-oxybenzoic acid, 4-oxyphthalic acid, gallic acid, and the like but both of the leuco dye and the developer are not limited thereto.

As the binder resin for use in the heat-sensitive coloring layer, other than the use of the AA-PVA-based resin of the invention and the crosslinking agent, there may be, for example, mentioned unmodified completely saponified PVA, unmodified partially saponified PVA, various modified PVA-based resins such as carboxyl group-modified, silicon-modified, sulfonic acid group-modified, cation group-modified, acetoacetyl group-modified, and diacetoneacrylamide-modified ones, water-soluble resins such as starch, hydroxyethylcellulose, methylcellulose, carboxymethylcellulose, gelatin, and casein, emulsions such as polyvinyl acetate, polyurethane, polyacrylate esters, and ethylene-vinyl acetate copolymers, various latexes such as styrene-butadiene resin-based, acrylic resin-based, and urethane resin-based ones, and the like.

Moreover, according to need, it is possible to add, into such a heat-sensitive coloring layer, inorganic pigments such as calcium carbonate, silica, kaolin, aluminum hydroxide, aluminum oxide, zinc oxide, titanium dioxide, clay, talc, and barium sulfate, organic resin powders such as urea-formalin resins, Nylon resins, acrylic resins, and styrene-methacrylic acid copolymers, higher fatty acid metal salts such as zinc stearate and calcium stearate, lubricants such as paraffin and polyethylene wax, UV absorbents such as benzophenone-based and benzotriazole-based ones, anionic and nonionic surfactants, fluorescent dyes, and the like.

The coating solution for the heat-sensitive coloring layer is obtained by pulverizing the above leuco dye and developer separately into a particle size of 1 to 3 μm using a known dispersing machine such as a ball mill, attritor, and a sand grinder to form a fine dispersion and mixing them with the AA-PVA-based resin as a binder resin, a crosslinking agent, and, according to need, the above additives and defoaming agent. The solid matter concentration of the coating solution is selected from the range of 10 to 40% by weight in consideration of workability.

At the application of the coating solution onto the supporting substrate, any known method such as a roll coater method, an air doctor method, a blade coater method, a bar coater method, a size press method, or a gate roll method may be employed. The amount of the aqueous solution to be coated is preferably from about 0.1 to 20 $g/m^2$, more preferably from about 0.5 to 15 $g/m^2$, particularly preferably from about 1 to 10 $g/m^2$.

The following will describe the protective layer.

The protective layer is formed by coating on the aforementioned heat-sensitive coloring layer a coating solution for the protective layer prepared by mixing the AA-PVA-based resin of the invention, a crosslinking agent, and, according to need, an inorganic pigment, a lubricant, and the like under stirring, followed by drying. The protective layer is effective for improving water resistance, chemical resistance, record running properties, and the like.

As the above inorganic pigment, there may be, for example, mentioned inorganic pigments such as calcium carbonate, silica, zinc oxide, aluminum oxide, aluminum hydroxide, titanium dioxide, talc, kaolin, and clay and organic pigments such as Nylon resin filler, urea-formalin resin filler, and starch particles. In particular, in the case where glossiness is imparted to the protective layer, inorganic ultrafine particles such as colloidal silica, gas-phase-process silica, and alumina sol are suitably used. Preferred average particle size of such inorganic fine particles is from 3 to 200 nm, further from 3 to 100 nm, particularly from 10 to 50 nm. When the average particle size is excessively small, writing properties and stamping properties sometimes decrease. Contrarily, when the size is too large, smoothness of the glossy layer surface is impaired and glossiness decreases in some cases. Thus, both cases are not preferred.

Moreover, it is possible to add, into such a protective layer, a higher fatty acid metal salt such as zinc stearate or calcium stearate, a lubricant such as paraffin or polyethylene wax, a UV absorbent such as benzophenone type or benzotriazole type one, an anionic and nonionic surfactant, a fluorescent dye, and the like.

The application of the coating solution for the protective layer can be carried out by any means such as a roll coater method, an air doctor method, a blade coater method, a bar coater method, a size press method, or a gate roll method. The amount of the liquid to be coated is preferably from about 0.5 to 10 g/m² as a dry weight. After the application, an objective coated layer is formed by air drying or slight heat treatment. Moreover, it is also possible to separately prepare aqueous solutions containing the AA-PVA-based resin of the invention and the crosslinking agent, respectively, and to laminate-coat them to form a protective layer. In that case, the pigment and various auxiliaries are preferably mixed with the aqueous solution of the AA-PVA-based resin and as a result, the AA-PVA-based resin and the crosslinking agent are contained in the protective layer. The content ratio, the amount to be coated, and the like may be adjusted in accordance with the above.

Moreover, when the AA-PVA-based resin of the invention is contained in the protective layer and the crosslinking agent is contained in the heat-sensitive coloring layer, the coating solutions containing the AA-PVA-based resin and the crosslinking agent, respectively, are separately prepared and may be coated onto the protective layer and the heat-sensitive coloring layer, respectively.

Furthermore, after the application on the heat-sensitive coloring layer or after the application on the protective layer, it is possible to improve smoothness and glossiness by super calendar treatment.

The following will describe an ink-jet recording medium having a layer containing the AA-PVA-based resin of the invention.

The ink-jet recording medium of the invention comprises the AA-PVA-based resin of the invention in the ink-absorption layer on the supporting substrate. More specifically, the AA-PVA-based resin of the invention is used as a binder of the inorganic fine particles for use in the ink-absorption layer.

In the case of the use in such a use, the saponification degree of the AA-PVA-based resin of the invention is preferably from 70% by mol to 99.5% by mol, more preferably from 80% by mol to 99.3% by mol, particularly preferably from 80% by mol to 98.5% by mol. The average polymerization degree is preferably from 150 to 4000, more preferably 300 to 3000, particularly preferably from 500 to 2500 and the AA-introduction degree is preferably from 0.3 to 20% by mol, more preferably from 0.5 to 15% by mol, particularly preferably from 1 to 10% by mol.

The supporting substrate for the ink-jet recording medium of the invention is not particularly limited and there may be, for example, used paper (hardboard such as manila board, white board, or liner, printing paper such as common wood free paper, medium-quality paper, or gravure paper, superior, medium, or inferior paper, news print paper, release paper, carbon paper, non-carbon paper, glassine paper, etc.), resin-coated paper, artificial paper, non-woven fabric, fabric, metal foil, and films or sheets formed of thermoplastic resins such as polyolefin resins (e.g., polyethylene, PET, polypropylene, polyvinyl chloride, ethylene-propylene copolymers, ethylene-vinyl acetate copolymers).

Moreover, the inorganic fine particles for use in the ink-absorption layer of the ink-jet recording medium of the invention is not particularly limited but there may be preferably used calcium carbonate, magnesium carbonate, kaolin, clay, talc, calcium sulfate, barium sulfate, titanium dioxide, zinc oxide, zinc hydroxide, zinc sulfide, zinc carbonate, hydrotalcite, aluminum silicate, magnesium silicate, calcium silicate, amorphous silica, gas-phase-process silica, colloidal silica (any of cationic and anionic ones may be used but cationic one is preferred in view of imparting glossiness), alumina, alumina sol, aluminum hydroxide, zeolite, magnesium hydroxide, zirconium oxide, zirconium hydroxide, cerium oxide, and the like and they may be used singly or in combination of two or more thereof.

In particular, in the case where smoothness and high glossiness are required as an ink-absorption layer of glossy paper, inorganic ultrafine particles such as colloidal silica, gas-phase-process silica, and alumina sol are suitably used. The preferred average particle size thereof is from 3 to 200 nm, further from 3 to 100 nm, particularly from 10 to 50 nm. When the average particle diameter is too small, voids owing to the inorganic fine particles in the glossy layer becomes too small and hence ink absorbability is inhibited at printing. As a result, feathering, spots in image parts, and the like are caused in some cases. Contrarily, when the diameter is too large, smoothness of the glossy layer surface is impaired and decrease in glossiness is invited. Thus, both cases are not preferred.

Moreover, in the case where the ink absorbability is more important than the glossiness as an ink-absorption layer of matt paper, amorphous silica is suitably used. The preferred average particle size thereof is from 0.1 to 50 μm, further from 0.3 to 30 μm, particularly from 0.5 to 20 μm. When the average particle diameter is too small, voids in the ink-absorption layer becomes small, ink absorbability decreases, and blurs and spots in images may be caused in some cases. Contrarily, when the diameter is too large, smoothness of the ink-absorption layer surface decreases and, in the case of matt type, texture decreases owing to roughness of the surface. Also, in the case where a glossy layer is provided thereon, glossiness is not obtained unless the thickness of the glossy layer is increased and, as a result, the ink absorbability decreases. Thus, both cases are not preferred.

In the case where the ink-jet recording medium is glossy paper, the content of the AA-PVA-based resin in the ink-absorption layer is preferably from 10 to 1000 parts by weight, more preferably from 25 to 400 parts by weight, particularly preferably from 40 to 100 parts by weight based on 100 parts by weight of the inorganic fine particles. When the content is too high, the void ratio in the ink-absorption layer decreases and hence decrease in ink absorbability, feathering and spots in image parts, decrease in sharpness of images, and the like are apt to occur. Contrarily, when the content is too low, decrease in surface smoothness and decrease in glossiness may be invited and/or the layer may be cracked in some cases. Thus, both cases are not preferred.

Furthermore, in the case of the matt type, the content of the AA-PVA-based resin in the ink-absorption layer is preferably from 5 to 100 parts by weight, more preferably from 10 to 50 parts by weight, particularly preferably from 10 to 30 parts by weight based on 100 parts by weight of the inorganic fine particles. When the content is too high, the ink absorbability decreases owing to decrease in the void ratio and hence feathering and bleeding may be caused in some cases. Contrarily, when the content is too low, dropping of inorganic fine particles and, in the case where a glossy layer is coated on the layer, decrease in surface strength at a wet state may sometimes occur. Thus, both cases are not preferred.

The ink-jet recording medium of the invention contains the AA-PVA-based resin as above and the inorganic fine particles in the ink-absorption layer. The following will specifically describe a process for producing the same.

Such an ink-absorption layer is provided on the aforementioned supporting substrate and is obtained by coating an aqueous coating solution containing the AA-PVA-based resin of the invention and the inorganic fine particles onto the supporting substrate, followed by drying.

Such a coating solution is formed by dissolving and dispersing the above AA-PVA-based resin and the inorganic fine particles in a medium mainly consisting of water. The method for dissolving and dispersing these components in the medium is not particularly limited but usually, a method of producing an aqueous solution of the AA-PVA-based resin and dispersing the inorganic fine particles therein is used. At such dispersing operation, a known mixing apparatus and method such as a high-speed homogenizer can be employed.

As the method of providing the ink-absorption layer on the supporting substrate, a known coating method such as a bar coater method, an air knife coater method, a blade coater method, or a curtain coater method may be used.

The total content of the solid matter in such a coating solution is not particularly limited but is preferably from 5 to 60% by weight, more preferably from 10 to 50% by weight, particularly preferably from 10 to 30% by weight based on the total of the coating solution. When the total content of the solid matter is less than 10% by weight, a drying load is required and also a receiving layer having homogeneous thickness is difficult to form. Contrarily, when the content exceeds 60% by weight, a high-speed application becomes difficult owing to the high viscosity of the solution and the workability is impaired. Thus, both cases are not preferred.

The amount of the coating solution to be coated is preferably so that the thickness after drying becomes preferably from 3 to 100 µm, more preferably from 5 to 80 µm, particularly from 10 to 50 µm.

In such a coating solution, the other water-soluble or water-dispersible resin can be used in combination. As the water-soluble or water-dispersible resin capable of combined use, there may be mentioned starch derivatives such as starch, oxidized starch, and cation-modified starch; natural proteins such as gelatin and casein; cellulose derivatives such as methylcellulose, ethylcellulose, hydroxyethylcellulose, and CMC; PVA derivatives such as unmodified PVA, cation-modified PVA, carboxylic acid-modified PVA, sulfonic acid-modified PVA, low ethylene-modified PVA having an ethylene content of 15% by mol or less, and partially saponified products of ethylene-vinyl acetate copolymers; natural polymeric polysaccharides such as sodium alginate and pectinic acid; water-soluble resins such as polyvinylpyrrolidone and poly(meth)acrylate salts; SBR latex, NBR latex, vinyl acetate resin-based emulsions, ethylene-vinyl acetate copolymer emulsions, (meth)acrylate ester resin-based emulsions, vinyl chloride resin-based emulsions, urethane resin-based emulsions, and the like but the water-soluble or water-dispersible resin is not limited thereto.

Moreover, in the coating solution, a cationic resin can be used in combination as a fixing agent for anionic ink. As such cationic resin, there may be mentioned polyalkylenepolyamines such as polyethylenepolyamine and polypropylenepolyamine and derivatives thereof; acrylic polymers having a secondary amino group, a tertiary amino group, or a quaternary ammonium salt, polyvinylamine copolymers, polyvinylamidine copolymers, dicyandiamide-formalin copolymers, dimethylamine-epichlorohydrin copolymers, acrylamide-diallylamine copolymers, diallyldimethylammonium chloride copolymers, and the like but the resin is not limited thereto.

Furthermore, as additives for such a coating solution, there may be suitably mixed a pigment dispersant, a thickener, a fluidity improver, a surfactant, a defoaming agent, a release agent, a penetrant, a dye, a pigment, a fluorescent brightening agent, a UV absorber, an antioxidant, an antiseptic, a fungicide, a paper intensity enhancer, a crosslinking agent, and the like.

As the crosslinking agent usable in the invention, there may be mentioned, as the organic crosslinking agent, aldehyde-based compounds (formaldehyde, glyoxal, glutaraldehyde, etc.), amino resins (urea resin, guanamine resin, melamine-based resin, methylolmelamine, etc.), epoxy-based compounds, hydrazide compounds (adipodihydrazide, carbodihydrazide, polyhydrazide, etc.), polyamide epichlorohydrin or acid anhydride, polyisocyanates, block isocyanates, and the like.

Moreover, there may be mentioned, as the inorganic crosslinking agent, boric acid, borate salts (borax, etc.), titanium compounds (tetraalkoxytitanates, etc.), aluminum compounds (aluminum sulfate, aluminum chloride, aluminum nitrate, etc.), phosphorus compounds (phosphite esters, bisphenol A-modified polyphosphoric acid, etc.), silicone compounds having a reactive functional group such as an alkoxy group or a glycidyl group, zirconium-based (halogenides, sulfate salts, organic acid salts) various non-metallic crosslinking agents such as chlorohydroxyoxozirconium compound and zirconium nitrate-based compounds (zirconyl nitrate $[ZrO(NO_3)_2]$, zirconium nitrate $[ZrO(NO_3)_4]$ or hydrates thereof, "zircosol ZN" manufactured by Daiichi Kigenso Kagaku Kogyo Co., Ltd. as a commercially available zirconium nitrate hydrate), and the like. These crosslinking agents may be used singly or in combination of two or more thereof.

After the application, drying is carried out and the drying conditions are not particularly limited but drying may be carried out usually at 90 to 120° C. for about 1 to 30 minutes.

Moreover, in the case of imparting glossiness, there is preferably used a method wherein surface glossiness/smoothness is imparted by contact with a cast drum under pressure in a wet state before drying or after once drying and subsequent treatment with a re-wetting liquid and by subsequent drying.

In this connection, in the invention, the inorganic fine particles are used as an essential component but even in the case of so-called swelling type recording medium wherein ink is absorbed through swelling of the water-soluble resin itself containing no such inorganic fine particles, advantages of ink absorbability, glossiness, and color development of ink are obtained by the use of such an AA-PVA-based resin.

Furthermore, the AA-PVA-based resin of the invention can be used in various uses utilizing the characteristic properties of the resin. Some of the uses have been described in the above but the following may be mentioned as the other specific examples.

(1) Binder-Related Uses binders for non-woven fabrics, binders for various powder particle formation, etc.

(2) Molding-Related Uses textiles, films (particularly, water-soluble films for packaging articles such as agricultural chemicals, detergents, clothes for washing, additives for civil engineering, fungicides, dyes, and pigments), sheets, pipes, tubes, leakage protecting films, temporary films, for chemical laces, water-soluble textiles, etc.

(3) Coating Agent-Related Uses sizing agents for textile products, warp siging agents, fiber processing agents, leather finishers, paints, defogging agents, metal corrosion inhibitors, brighteners for zinc plating, antistatic agents, conducting agents, ship bottom paints, antiscaling agents, etc.

(4) Suspending Agent-Related Uses
pigment dispersion stabilizers for paints, India ink, aqueous color, adhesives, and the like, dispersion stabilizers for suspension polymerization of various vinyl compounds such as vinyl chloride, vinylidene chloride, styrene, (meth)acrylates, and vinyl acetate, etc.
(5) Paper Converting Agent-Related Uses
paper sizing agents, clear coating agents for paper, pigment coating agents for paper,
(6) Photosensitive Agent, Electron-Sensitive-Related Uses, Photosensitive Resist Resins, Etc.
(7) Polarizing Film, Etc.
(8) Coagulant-Related Uses
coagulants of suspended matter in water and dissolved matter, filtering agents for pulp and slurry, etc.
(9) Thickener-Related Uses
(10) Other Ion-Exchange Resin, Ion-Exchange Membrane-Related Uses, Chelete-Exchange Resins, Etc.
Of the above, usefulness thereof is particularly expected in the uses of (1) to (7).

EXAMPLES

The following will describe the invention with reference to Examples but the invention is not limited to the description in such Examples unless it exceeds the gist.
In examples, "part(s)" and "%" means weight based ones unless otherwise stated.

Example 1

Production of 1,2-diol-modified PVA-based resin

Into a reaction tank fitted with a reflux condenser, a dropping funnel, and a stirrer were charged 1200 g of vinyl acetate, 216 g of methanol, and 72 g (3% by mol) of 3,4-diacetoxy-1-butene, then 0.05% by mol (based on charged vinyl acetate) of azobisisobutyronitrile was charged thereto, and temperature was elevated with stirring under a nitrogen stream to initiate polymerization. At the time when polymerization rate of vinyl acetate reached 89%, a predetermined amount of m-dinitrobenzne was added thereto to finish the polymerization. Subsequently, unreacted vinyl acetate monomer was removed to outside of the system by a method of blowing methanol vapor therein to obtain a methanol solution of a copolymer.
Then, the solution was diluted with methanol to adjust the concentration to 35% and the resulting solution was charged into a kneader. While the solution temperature was maintained at 40° C., a 2% methanol solution of sodium hydroxide was added thereto so that the ratio of sodium hydroxide was 8 mmol relative to 1 mol of the total amount of the vinyl acetate structural unit and the 3,4-diacetoxy-1-butene structural unit, thereby saponification being carried out. With the progress of the saponification, a saponified product precipitated and, at the time when it was transformed into a particle form, was filtered, well washed with methanol, and dried in a hot-air drying machine to obtain a 1,2-diol-modified PVA-based resin.
The saponification degree of the resulting 1,2-diol-modified PVA-based resin was found to be 99.2% by mol when analyzed with a consumed amount of alkali required for hydrolysis of remaining vinyl acetate and 3,4-diacetoxy-1-butene and the average polymerization degree was found to be 1300 when analyzed in accordance with JIS K 6726. Moreover, the content of the 1,2-diol structural unit was found to be 3.0% by mol when measured by $^1$H-NMR and calculated. Furthermore, the content of sodium acetate was found to be 0.6%.

Production of AA-PVA-Based Resin (I)

The 1,2-diol-modified PVA-based resin was charged into a kneader in an amount of 100 parts, and then 15 parts of acetic acid was introduced thereto, thereby the resin being swollen. With stirring at a rotation number of 20 rpm, after temperature was elevated to 60° C., 27 parts of diketene was added dropwise over a period of 2 hours and the reaction was further continued for 30 minutes. After completion of the reaction, the resin was washed with 400 parts of methanol twice and then dried at 70° C. for 8 hours to obtain an AA-PVA-based resin (I).
The AA-introduction degree of the resulting AA-PVA-based resin (I) was 12.0% by mol, the content of sodium acetate was 0.05%, and the content of acetic acid was 0.15% (value of equation (7)=−0.61). Moreover, pH of a 4% aqueous solution of the AA-PVA-based resin was 4.1.
Attribution of IR spectrum, $^1$H-NMR spectrum (internal standard substance: tetramethylsilane, solvent: DMSO-d6) and $^{13}$C-NMR spectrum (internal standard substance: Na trimethylsilylpropionate, solvent: D$_2$O) were as follows. IR chart was shown in FIG. 1, $^1$H-NMR chart in FIG. 2, and $^{13}$C-NMR spectrum in FIG. 3. In this connection, "270-30" manufactured by Hitachi, Ltd. was used for IR measurement, "UNITY 300" manufactured by Varian for $^1$H-NMR measurement, and "AVANCE DPX400" manufactured by Bruker, Japan Co., Ltd. for $^{13}$C-NMR spectrum measurement.

[IR] (See FIG. 1)
3360 cm$^{-1}$: OH
2940 cm$^{-1}$: —CH$_2$—
1730, 1710 cm$^{-1}$: C=O
1420 cm$^{-1}$: —CH$_3$
1320 cm$^{-1}$: C—H
1090 cm$^{-1}$: C—O

[$^1$H-NMR] (See FIG. 2)
1.1 to 1.8 ppm: methylene proton in main chain, methine proton to which only carbon atoms in main chain are bonded
1.9 to 2.0 ppm: methyl proton in vinyl acetate structural unit
2.2 ppm: methyl proton of acetoacetic ester group
3.4 to 3.6 ppm: methylene proton of acetoacetic ester group, methylene proton to which hydroxyl group in side chain is bonded
3.6 to 4.0 ppm: methine proton to which hydroxyl group in main chain or side chain is bonded, methine proton in vinyl acetate structural unit
4.1 to 4.7 ppm: proton of hydroxyl group
5.0 to 5.2 ppm: methine proton to which acetoacetic ester group in side chain is bonded, methine proton to which acetoacetic ester group in main chain or side chain is bonded

[$^{13}$C-NMR Spectrum] (See FIG. 3)
33 ppm: methyl carbon of acetoacetic ester group
35 to 48 ppm: methylene carbon in main chain, methylene carbon of acetoacetic ester group, methine carbon to which only carbons in main chain are bonded
66 to 67 ppm: methylene carbon to which hydroxyl group in side chain is bonded
67 to 71 ppm: methine carbon in vinyl alcohol structural unit, methine carbon in vinyl acetate structural unit, methylene carbon to which acetoacetic ester group in side chain is bonded
73 to 75 ppm: methine carbon to which acetoacetic ester group in main chain is bonded 77 ppm: methine carbon to which hydroxyl group in side chain is bonded 172 ppm: carbonyl carbon of ester portion of acetoacetic ester group 210 ppm: carbonyl carbon which is bonded to methyl carbon of acetoacetic ester group The following evaluation was carried out on the resulting AA-PVA-based resin (I). Results are shown in Table 1.

<Insoluble Matter>

Into 200 g of ion-exchange water of 15° C. was charged 20 g of the AA-PVA-based resin (I), which was dispersed and dissolved therein by temperature elevation and stirring at 95° C. for 1 hour. The whole was filtered through a metal gauze of 44 μm. The metal gauze was further washed with 2 L of hot water of 80 to 90° C. and dried at 105° C. for 2 hours and then an insoluble matter ratio (%) was determined based on the weight. At the calculation of the insoluble matter ratio (%), it was calculated according to the equation: {(weight of metal gauze after drying of insoluble matter−weight of metal gauze)/sample weight}×100.

<Transparency>

In accordance with JIS K 6726, transmittance of a 4% aqueous solution of the AA-PVA-based resin (I) at a wavelength of 430 nm at 25° C. was determined by a spectrophotometer.

<Viscosity Stability of Aqueous Solution>

After viscosity (a) of a 15% aqueous solution of the AA-PVA-based resin (I) at 25° C. was measured by a Brookfield viscometer (manufactured by Brookfield, rotor No. 3, rotation number 10 rpm), the aqueous solution was allowed to stand for 1 month in a constant-temperature tank of 60° C. Viscosity (b) of the aqueous solution after the standing was measured and the stability was shown as a viscosity ratio (b)/(a).

<Water Resistance>

Five parts of glyoxal was added to 100 parts of a 10% aqueous solution of the AA-PVA-based resin (I) and the resulting aqueous solution was cast on a PET film. After standing under conditions of 23° C. and 50% RH for 48 hours, the cast was subjected to heat treatment at 50° C. for 5 minutes to prepare a film of the resin composition. Such a film was immersed in hot water of 90° C. for 1 hour and then an elution ratio (%) of the film was measured. At the calculation of the elution ratio (%), weights of the film before and after the hot-water immersion (all as dry weights) were determined and the ratio was calculated according to the equation: {(weight of film before immersion−weight of film after immersion)/weight of film before immersion}×100.

Example 2

Production of 1,2-diol-modified PVA-based resin

Into a reaction tank fitted with a reflux condenser, a dropping funnel, and a stirrer were charged 1200 g of vinyl acetate, 360 g of methanol, and 36 g (1.5% by mol) of 3,4-diacetoxy-1-butene, then 0.03% by mol (based on charged vinyl acetate) of azobisisobutyronitrile was charged thereto, and temperature was elevated with stirring under a nitrogen stream to initiate polymerization. At the time when the polymerization rate of vinyl acetate reached 90%, a predetermined amount of m-dinitrobenzne was added thereto to finish the polymerization. Subsequently, unreacted vinyl acetate monomer was removed to outside of the system by a method of blowing methanol vapor therein to obtain a methanol solution of a copolymer.

Then, the solution was diluted with methanol to adjust the concentration to 35% and the resulting solution was charged into a kneader. While the solution temperature was maintained at 40° C., a 2% methanol solution of sodium hydroxide was added thereto so that the ratio of sodium hydroxide was 6 mmol relative to 1 mol of the total amount of the vinyl acetate structural unit and the 3,4-diacetoxy-1-butene structural unit, thereby saponification being carried out. With the progress of the saponification, a saponified product precipitated and, at the time when it was transformed into a particle form, was filtered, well washed with methanol, and dried in a hot-air drying machine to obtain a 1,2-diol-modified PVA-based resin.

The saponification degree of the resulting 1,2-diol-modified PVA-based resin was found to be 98.5% by mol when analyzed with a consumed amount of alkali required for hydrolysis of remaining vinyl acetate and 3,4-diacetoxy-1-butene, and the average polymerization degree was found to be 1400. Moreover, the content of the 1,2-diol structural unit was found to be 1.4% by mol. Furthermore, the content of sodium acetate was found to be 0.5%.

Production of AA-PVA-Based Resin (II)

The 1,2-diol-modified PVA-based resin was charged into a kneader in an amount of 100 parts, then 20 parts of acetic acid was introduced thereto, thereby the resin being swollen. With stirring at a rotation number of 20 rpm, after temperature was elevated to 60° C., 24 parts of diketene was added dropwise over a period of 2 hours and the reaction was further continued for 30 minutes. After completion of the reaction, the resin was washed in the same manner as in Example 1 to obtain an AA-PVA-based resin (II).

The AA-introduction degree of the resulting AA-PVA-based resin (II) was 9.8% by mol, the content of sodium acetate was 0.05%, and the content of acetic acid was 0.22% (value of equation (7)=−0.78).

The same evaluation as in Example 1 was carried out on the resulting AA-PVA-based resin (II). The results are shown in Table 1. Moreover, pH of a 4% aqueous solution of the AA-PVA-based resin was 4.0.

Example 3

Production of 1,2-diol-modified PVA-based resin

Into a reaction tank fitted with a reflux condenser, a dropping funnel, and a stirrer were charged 1500 g of vinyl acetate, 75 g of methanol, and 240 g (8% by mol) of 3,4-diacetoxy-1-butene, then 0.03% by mol (based on charged vinyl acetate) of azobisisobutyronitrile was charged thereto, and temperature was elevated with stirring under a nitrogen stream to initiate polymerization. At the time when the polymerization rate of vinyl acetate reached 73%, a predetermined amount of m-dinitrobenzne was added thereto to finish the polymerization. Subsequently, unreacted vinyl acetate monomer was removed to outside of the system by a method of blowing methanol vapor therein to obtain a methanol solution of a copolymer.

Then, the solution was diluted with methanol to adjust the concentration to 35% and the resulting solution was charged into a kneader. While the solution temperature was maintained at 40° C., a 2% methanol solution of sodium hydroxide was added thereto so that the ratio of sodium hydroxide was 5 mmol relative to 1 mol of the total amount of the vinyl acetate structural unit and the 3,4-diacetoxy-1-butene structural unit, thereby saponification being carried out. With the progress of the saponification, a saponified product precipitated and, at the time when it was transformed into a particle form, the product was filtered, well washed with methanol, and dried in a hot-air drying machine to obtain a 1,2-diol-modified PVA-based resin.

The saponification degree of the resulting 1,2-diol-modified PVA-based resin was found to be 92.5% by mol when analyzed with a consumed amount of alkali required for hydrolysis of remaining vinyl acetate and 3,4-diacetoxy-1-butene, and the average polymerization degree was found to be 1100. Moreover, the content of the 1,2-diol structural unit was found to be 7.8% by mol. Furthermore, the content of sodium acetate was found to be 0.4%.

Production of AA-PVA-Based Resin (III)

The 1,2-diol-modified PVA-based resin was charged into a kneader in an amount of 100 parts, then 3 parts of acetic acid was introduced thereto, thereby the resin being swollen. With stirring at a rotation number of 20 rpm, after temperature was elevated to 60° C., 12 parts of diketene was added dropwise over a period of 2 hours and the reaction was further continued for 30 minutes. After completion of the reaction, the resin was washed with 600 parts of methanol and then dried at 70° C. for 8 hours to obtain an AA-PVA-based resin (III).

The AA-introduction degree of the resulting AA-PVA-based resin (III) was 5.4% by mol, the content of sodium acetate was 0.1%, and the content of acetic acid was 0.12% (value of equation (7)=−0.21). Moreover, pH of a 4% aqueous solution of the AA-PVA-based resin was 4.5.

The same evaluation as in Example 1 was carried out on the resulting AA-PVA-based resin (III). The results are shown in Table 1.

Example 4

Production of 1,2-diol-modified PVA-based resin

Into a reaction tank fitted with a reflux condenser, a dropping funnel, and a stirrer were charged 1500 g of vinyl acetate, 150 g of methanol, and 138 g (6% by mol) of glycerin monoallyl ether, then 0.5% by mol (based on charged vinyl acetate) of azobisisobutyronitrile was charged thereto, and temperature was elevated with stirring under a nitrogen stream to initiate polymerization. At the time when the polymerization rate of vinyl acetate reached 96%, a predetermined amount of m-dinitrobenzne was added thereto to finish the polymerization. Subsequently, unreacted vinyl acetate monomer was removed to outside of the system by a method of blowing methanol vapor therein to obtain a methanol solution of a copolymer.

Then, the solution was diluted with methanol to adjust the concentration to 55% and the resulting solution was charged into a kneader. While the solution temperature was maintained at 40° C., a 2% methanol solution of sodium hydroxide was added thereto so that the ratio of sodium hydroxide was 8 mmol relative to 1 mol of the vinyl acetate structural unit in the copolymer, thereby saponification being carried out. With the progress of the saponification, a saponified product precipitated and, at the time when it was transformed into a particle form, the product was filtered, well washed with methanol, and dried in a hot-air drying machine to obtain a 1,2-diol-modified PVA-based resin.

The saponification degree of the resulting 1,2-diol-modified PVA-based resin was found to be 99.4% by mol and the average polymerization degree was found to be 400. Moreover, the content of the 1,2-diol structural unit was found to be 5.8% by mol. Furthermore, the content of sodium acetate was found to be 1.0%.

Production of AA-PVA-Based Resin (IV)

The 1,2-diol-modified PVA-based resin was charged into a kneader in an amount of 100 parts, then 3 parts of acetic acid was introduced thereto, thereby the resin being swollen. With stirring at a rotation number of 20 rpm, after temperature was elevated to 60° C., 7.4 parts of diketene was added dropwise over a period of 2 hours and the reaction was further continued for 30 minutes. After completion of the reaction, the resin was washed with 400 parts of methanol and then dried at 80° C. for 12 hours to obtain an AA-PVA-based resin (IV).

The AA-introduction degree of the resulting AA-PVA-based resin (IV) was 3.2% by mol, the content of sodium acetate was 0.33%, and the content of acetic acid was 0.03% (value of equation (7)=0.91). Moreover, pH of a 4% aqueous solution of the AA-PVA-based resin was 5.7.

The same evaluation as in Example 1 was carried out on the resulting AA-PVA-based resin (IV). The results are shown in Table 1.

Example 5

Production of 1,2-diol-modified PVA-based resin

Into a reaction tank fitted with a reflux condenser, a dropping funnel, and a stirrer were charged 1500 g of vinyl acetate, 75 g of methanol, and 29.8 g (1.5% by mol) of vinylethylene carbonate, then 0.02% by mol (based on charged vinyl acetate) of azobisisobutyronitrile was charged thereto, and temperature was elevated with stirring under a nitrogen stream to initiate polymerization. At the time when the polymerization rate of vinyl acetate reached 65%, a predetermined amount of m-dinitrobenzne was added thereto to finish the polymerization. Subsequently, unreacted vinyl acetate monomer was removed to outside of the system by a method of blowing methanol vapor therein to obtain a methanol solution of a copolymer.

Then, the solution was diluted with methanol to adjust the concentration to 30% and the resulting solution was charged into a kneader. While the solution temperature was maintained at 40° C., a 2% methanol solution of sodium hydroxide was added thereto so that the ratio of sodium hydroxide was 4.5 mmol relative to 1 mol of the vinyl acetate structural unit in the copolymer, thereby saponification being carried out. With the progress of the saponification, a saponified product precipitated and, at the time when it was transformed into a particle form, the product was filtered, well washed with methanol, and dried in a hot-air drying machine to obtain a 1,2-diol-modified PVA-based resin.

The saponification degree of the resulting 1,2-diol-modified PVA-based resin was found to be 82.1% by mol and the average polymerization degree was found to be 2100. Moreover, the content of the 1,2-diol structural unit was found to be 1.5% by mol. Furthermore, the content of sodium acetate was found to be 0.3%.

Production of AA-PVA-Based Resin (V)

The 1,2-diol-modified PVA-based resin was charged into a kneader in an amount of 100 parts, then 0.5 part of acetic acid was introduced thereto, thereby the resin being swollen. With stirring at a rotation number of 20 rpm, after temperature was elevated to 60° C., 1.5 parts of diketene was added dropwise over a period of 1 hours and the reaction was further continued for 30 minutes. After completion of the reaction, the resin was washed with 600 parts of methanol and then dried at 70° C. for 8 hours to obtain an AA-PVA-based resin (V).

The AA-introduction degree of the resulting AA-PVA-based resin (V) was 0.6% by mol, the content of sodium acetate was 0.08%, and the content of acetic acid was 0.001% (value of equation (7)=1.77). Moreover, pH of a 4% aqueous solution of the AA-PVA-based resin was 6.5.

The same evaluation as in Example 1 was carried out on the resulting AA-PVA-based resin (V). The results are shown in Table 1.

Example 6

Production of 1,2-diol-modified PVA-based resin

Into a reaction tank fitted with a reflux condenser, a dropping funnel, and a stirrer were charged 900 g of vinyl acetate, 900 g of methanol, and 5.4 g (0.4% by mol) of 2,2-dimethyl-4-vinyl-1,3-dioxolane, then 0.2% by mol (based on charged vinyl acetate) of azobisisobutyronitrile was charged thereto, and temperature was elevated with stirring under a nitrogen stream to initiate polymerization. At the time when the polymerization rate of vinyl acetate reached 96%, a predetermined amount of m-dinitrobenzne was added thereto to finish the polymerization. Subsequently, unreacted vinyl acetate monomer was removed to outside of the system by a method of blowing methanol vapor therein to obtain a methanol solution of a copolymer.

Then, the solution was diluted with methanol to adjust the concentration to 50% and the resulting solution was charged into a kneader. While the solution temperature was maintained at 40° C., a 2% methanol solution of sodium hydroxide was added thereto so that the ratio of sodium hydroxide was 10 mmol relative to 1 mol of the vinyl acetate structural unit in the copolymer, thereby saponification being carried out. With the progress of the saponification, a saponified product precipitated and finally became a particle form. Such a saponification product was dispersed in 3N hydrochloric acid (a mixed solvent of water/methanol=1/1) and deketalization was effected at 60° C. The resulting 1,2-diol-modified PVA-based resin was filtered, well washed with methanol, and dried in a hot-air drying machine to obtain an objective substance.

The saponification degree of the resulting 1,2-diol-modified PVA-based resin was found to be 99.9% by mol and the average polymerization degree was found to be 630. Moreover, the content of the 1,2-diol structural unit was found to be 0.3% by mol. Furthermore, the content of sodium acetate was found to be 0%.

Production of AA-PVA-Based Resin (VI)

The 1,2-diol-modified PVA-based resin was charged into a kneader in an amount of 100 parts, then 45 parts of acetic acid containing 0.1 part of Na acetate dissolved therein was introduced thereto, thereby the resin being swollen. With stirring at a rotation number of 20 rpm, after temperature was elevated to 60° C., 18.4 parts of diketene was added dropwise over a period of 2 hours and the reaction was further continued for 30 minutes. After completion of the reaction, the resin was washed twice with 400 parts of methanol and then dried at 70° C. for 8 hours to obtain an AA-PVA-based resin (VI).

The AA-introduction degree of the resulting AA-PVA-based resin (VI) was 6.0% by mol, the content of sodium acetate was 0.004%, and the content of acetic acid was 0.58% (value of equation (7)=−2.30). Moreover, pH of a 4% aqueous solution of the AA-PVA-based resin was 2.5.

The same evaluation as in Example 1 was carried out on the resulting AA-PVA-based resin (VI). The results are shown in Table 1.

Comparative Example 1

Production of AA-PVA-Based Resin (VII)

An unmodified PVA resin having an average polymerization degree of 1300, a saponification degree of 99.2% by mol, and a sodium acetate content of 0.5% was charged into a kneader in an amount of 100 parts, then 30 parts of acetic acid was introduced thereto, thereby the resin being swollen. With stirring at a rotation number of 20 rpm, after temperature was elevated to 60° C., 27 parts of diketene was added dropwise over a period of 2 hours and the reaction was further continued for 30 minutes. After completion of the reaction, the resin was washed in the same manner as in Example 1 to obtain an AA-PVA-based resin (VII).

The AA-introduction degree of the resulting AA-PVA-based resin (VII) was 9.2% by mol. Moreover, the content of sodium acetate was 0.04%, and the content of acetic acid was 0.33% (value of equation (7)=−1.05). Furthermore, pH of a 4% aqueous solution of the AA-PVA-based resin (VII) was 3.7.

The same evaluation as in Example 1 was carried out on the resulting AA-PVA-based resin (VII). The results are shown in Table 1.

Comparative Example 2

Production of AA-PVA-Based Resin (VIII)

An unmodified PVA resin having an average polymerization degree of 500, a saponification degree of 98.5% by mol, and a sodium acetate content of 0.3% was charged into a kneader in an amount of 100 parts, then 10 parts of acetic acid was introduced thereto, thereby the resin being swollen. With stirring at a rotation number of 20 rpm, after temperature was elevated to 60° C., 18 parts of diketene was added dropwise over a period of 2 hours and the reaction was further continued for 30 minutes. After completion of the reaction, the resin was washed in the same manner as in Example 3 to obtain an AA-PVA-based resin (VIII).

The AA-introduction degree of the resulting AA-PVA-based resin (VIII) was 5.1% by mol. Moreover, the content of sodium acetate was 0.11%, and the content of acetic acid was 0.21% (value of equation (7)=−0.42). Furthermore, pH of a 4% aqueous solution of the AA-PVA-based resin (VIII) was 4.3.

The same evaluation as in Example 1 was carried out on the resulting AA-PVA-based resin (VIII). The results are shown in Table 1.

TABLE 1

| | AA-introduced PVA | Insoluble matter ratio (%) | Transparency (%) | Viscosity stability of aqueous solution | Water resistance (%) |
|---|---|---|---|---|---|
| Example 1 | I | 0.010 | 94 | 1.2 | 3.4 |
| Example 2 | II | 0.008 | 96 | 1.3 | 4.2 |
| Example 3 | III | 0.010 | 94 | 1.0 | 4.5 |
| Example 4 | IV | 0.015 | 92 | 1.7 | 5.2 |
| Example 5 | V | 0.013 | 93 | 1.4 | 7.2 |
| Example 6 | VI | 0.017 | 91 | 1.9 | 5.8 |
| Comparative Example 1 | VII | 0.64 | 32 | gelation | 10.6 |
| Comparative Example 2 | VIII | 0.15 | 47 | 4.5 | 12.4 |

Example 7

Using the AA-PVA-based resin (I) obtained in Example 1, the following aqueous emulsion was prepared.
(Preparation of Aqueous Emulsion)

Into a separable flask fitted with a stirrer, a reflux condenser, a dropping funnel, and a thermometer were charged 9 parts of water, 50 parts of a 8% aqueous solution of the AA-PVA-based resin (I) obtained in Example 1, 0.02 part of sodium acetate as a pH adjuster, and 3.6 parts of vinyl acetate monomer, followed by elevation of temperature in the flask to 70° C. with stirring. In the meantime, the atmosphere in the flask was replaced with nitrogen gas and 15 parts of a 1.61% aqueous ammonium persulfate solution was added thereto to initiate polymerization. The initial polymerization was continued for 30 minutes and remaining 32.4 parts of vinyl acetate monomer was added dropwise over a period of 3 hours. Furthermore, 15 parts of a 1.6% aqueous ammonium persulfate solution was added every one hour four times to carry out the polymerization. Then, after aging at 75° C. for 1 hour, the whole was cooled to obtain an aqueous emulsion of acetic acid having a solid matter content of 40%.

Figure 2:
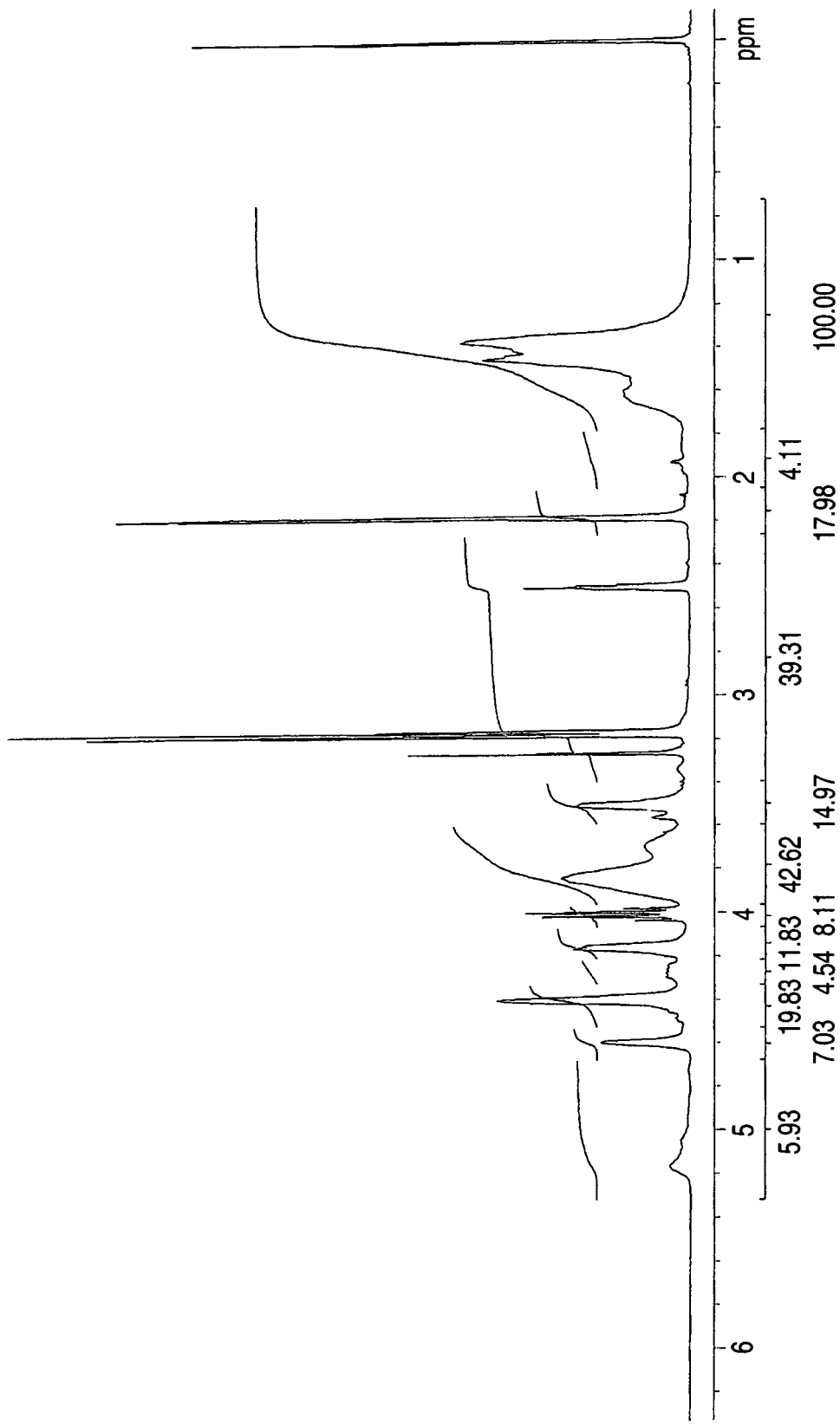
FIG. 2 is a $^1$H-NMR spectrum chart of the AA-PVA-based resin (I).
Figure 3:
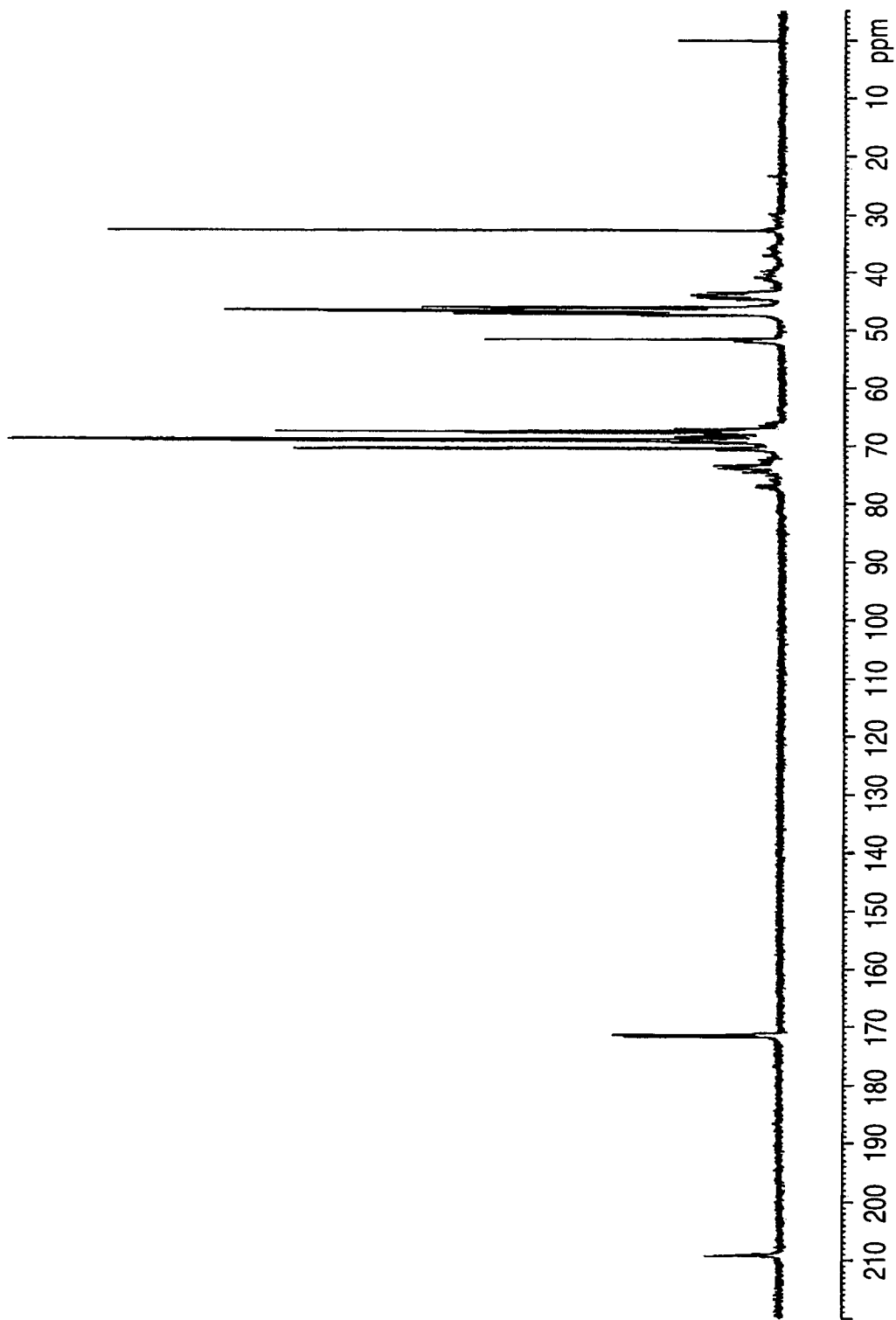
FIG. 3 is a $^{13}$C-NMR spectrum chart of the AA-PVA-based resin (I).

The following evaluation was carried out on the aqueous emulsion obtained above. The results are shown in FIG. 2.
<Hot-Water Resistant Adhesiveness>

After a test piece was prepared in accordance with JIS K 6804, an adhesion strength (Kg/cm²) was measured in accordance with the boiling repeating test of JIS K 6852.
<High-Temperature Standing Stability>

The emulsion immediately after production was allowed to stand at 40° C. to investigate the number of days until viscosity was doubled.

Example 8

Comparative Examples 3 and 4

Aqueous emulsions were obtained in the same manner as in Example 1 except that the AA-PVA-based resins (III, VII, VIII) obtained in Example 3 and Comparative Examples 1 and 2 were used, and then evaluation was similarly carried out. The results are shown in Table 2.

TABLE 2

| | AA-introduced PVA | Hot-water resistant adhesiveness | Standing stability at high-temperature |
|---|---|---|---|
| Example 7 | I | 91 | 50< |
| Example 8 | III | 85 | 50< |
| Comparative Example 3 | VII | flocculation during polymerization | |
| Comparative Example 4 | VIII | 72 | 9 |

Example 9

Using the AA-PVA-based resin (II) obtained in Example 2, the following adhesive was prepared.
(Preparation of Quickly Curable Adhesive)

The following main agent and curing agent were prepared.

| | |
|---|---|
| Main agent: 10% aqueous solution of AA-PVA-based resin (II) | 100 parts |
| Emulsion of vinyl acetate resin having a solid matter content of 42% ("Movinyl AD50" manufactured by Clariant Polymer) | 50 parts |
| Curing agent: 10% aqueous solution of adipodihydrazide | |

Using the quickly curable aqueous adhesive prepared above, the following evaluation was carried out. The results are shown in Table 3.
<Normal-State Adhesion Strength>

The main agent was coated on a surface to be adhered of one of two pieces of birth having a size of 25 mm×30 mm×10 mm so as to be in an amount of 100 g/m² and a curing agent was coated on another surface to be adhered so as to be in an amount of 50 g/m². The both surfaces were adhered and immediately pressed at 5 kg/cm². After 5 seconds, the pressure was released and compressive shear strength was measured immediately after the release, after 5 minutes, and after 72 hours of aging (standing at room temperature) in accordance with JIS K 6852.
<Hot-Water Adhesion Strength>

After the adhered sample prepared in the same manner as above was allowed to stand at room temperature for 72 hours, the sample was immersed in boiling water for 4 hours and then dried in the air of 60° C. for 20 hours. Again, it was immersed in boiling water for 4 hours and then allowed to stand in an immersed state until the temperature reached room temperature. Adhesion strength immediately after it was taken out of water (in a still wet state) was measured in accordance with JIS K 6852.

Example 10

Comparative Example 5

Quickly curable adhesives were obtained in the same manner as in Example 9 except that the AA-PVA-based resin (VI)

obtained in Example 6 and the AA-PVA-based resin (VII) obtained in Comparative Example 1 were used and evaluation was carried out in the same manner. The results are shown in Table 3.

TABLE 3

|  | AA-introduced PVA | Adhesion Strength (kg/cm$^2$) | | | |
|---|---|---|---|---|---|
|  |  | Normal state | | | Hot-water resistance |
|  |  | Immediately after | After 5 minutes | After 72 hours |  |
| Example 9 | II | 78 | 188 | 280 | 220 |
| Example 10 | VI | 62 | 142 | 262 | 195 |
| Comparative Example 5 | VII | 36 | 92 | 208 | 133 |

Example 11

Using the AA-PVA-based resin (III) obtained in Example 3, the following adhesive was prepared.
(Preparation of Two Component Adhesive)
The following main agent and curing agent were prepared.

| Main agent: | |
|---|---|
| 15% aqueous solution of AA-PVA-based resin (III) | 40 parts |
| Emulsion of styrene-butadiene copolymer having a solid matter content of 50% ("DL612" manufactured by Asahi Kasei Corporation) | 35 parts |
| Calcium carbonate | 20 parts |
| Water | 5 parts |
| Curing agent: | |
| MDI (NCO group content 6.71 × 10−3 mol/g) | 9.72 parts |

The main agent and curing agent prepared above were mixed and stirred to form an adhesive and the following evaluation was carried out. The results are shown in Table 4.
<Normal-State Adhesion Strength>
The above adhesive was coated on each one surface to be adhered of two pieces of birth straight-grained comber board (10 mm×25 mm×30 mm) so as to be in an amount of 100±10 g/m$^2$. The coated surfaces were adhered to each other and pressed at 8 kg/cm$^2$ for 12 hours to prepare a test piece. Then, adhesion strength at that time was measured in accordance with JIS K 6852.
<Hot-Water Adhesion Strength>
After the adhered sample prepared in the same manner as above was allowed to stand at room temperature for 72 hours, the sample was immersed in boiling water for 4 hours and then dried in the air of 60° C. for 20 hours. Again, it was immersed in boiling water for 4 hours and then allowed to stand in an immersed state until the temperature reached room temperature. Adhesion strength immediately after it was taken out of water (in a still wet state) was measured in accordance with JIS K 6852.

Example 12

Comparative Example 6

Two component adhesives were obtained in the same manner as in Example 11 except that the AA-PVA-based resin (IV) obtained in Example 4 and the AA-PVA-based resin (VIII) obtained in Comparative Example 2 were used, and then evaluation was carried out in the same manner. The results are shown in Table 4.

TABLE 4

|  | AA-introduced PVA | Adhesion Strength (kg/cm$^2$) | |
|---|---|---|---|
|  |  | Normal state | Hot-water resistance |
| Example 11 | III | 268 | 232 |
| Example 12 | IV | 233 | 174 |
| Comparative Example 6 | VIII | 175 | 87 |

Example 13

Using the AA-PVA-based resin (I) obtained in Example 1, a heat-sensitive recording medium was prepared in the following manner.
(Preparation of Heat-Sensitive Recording Medium)
First, the following aqueous liquids (Liquids A to C) were prepared.

| Liquid A | |
|---|---|
| 10% Aqueous solution of AA-PVA-based resin (I) | 100 parts |
| 40% Aqueous solution of glyoxal | 1 part |
| Colloidal silica (20% dispersion of "Snow Tex O" manufactured by Nissan Chemical Industries, Ltd.) | 25 parts |
| Kaolin | 5 parts |
| Liquid B | |
| Bisphenol A | 50 parts |
| 5% Aqueous solution of unmodified PVA (saponification degree of 98% by mol, average polymerization degree of 1100) | 100 parts |
| Stearamide | 20 parts |
| Liquid C | |
| Crystal violet lactone | 10 parts |
| 5% Aqueous solution of unmodified PVA (saponification degree of 98% by mol, average polymerization degree of 1100) | 10 parts |
| Water | 80 parts |

The above Liquid B and Liquid C were separately pulverized by a sand grinder until the average particle size became about 2 µm. Then, 170 parts of Liquid B, 100 parts of Liquid C, 40 parts of calcium carbonate, 80 parts of a 10% aqueous solution of unmodified PVA (saponification degree of 98% by mol, average polymerization degree of 1100) were mixed to obtain a coating solution for a heat-sensitive coloring layer. Such a coating solution was coated onto a wood free paper (substrate) having a basic weight of 50 g/m$^2$ so that the coated amount after drying was 8 g/m$^2$. After the liquid was dried to form a heat-sensitive recording layer, Liquid A was coated onto the layer by a Dickson coater so that the coated amount after drying was 5 g/m$^2$. The liquid was dried at 40° C. to form a protective layer and the surface was smoothened using a super calender. Furthermore, Liquid A was also coated onto an opposite surface of the above coated surface in the same manner using a Dickson coater. The liquid was dried at 40° C. and the surface was smoothened using a super calender to obtain a heat-sensitive recording medium (I-a). Separately, a heat-sensitive recording medium (I-b) was obtained by forming protective layers in the same manner as above except that the drying temperature was changed to 60° C.

The following evaluation was carried out on the heat-sensitive recording media (I-a) and (I-b) obtained above. The results are shown in Table 5.

<Warm-Water Resistance>

Using a heat gradient tester (manufactured by Toyo Seiki Seisaku-sho, Ltd.), the resulting heat-sensitive recording media (I-a) and (I-b) were heat-pressed for 5 seconds under a pressure of 2 kg/cm$^2$ on a hot plate of 120° C. to develop color. Color density was measured by a Macbeth densitometer ("RD-100R Model" manufactured by Macbeth, using an amber filter). Furthermore, after the colored heat-sensitive recording media were immersed in water of 60° C. for 24 hours, they are naturally dried and the color density of the printed part was similarly measured. A ratio of the print density after immersion to the print density before immersion was calculated and used as a measure of water resistance.

<Plasticizer Resistance>

A polyvinyl chloride film containing a plasticizer was wound on the above colored heat-sensitive recording media (I-a) and (I-b) triply and the whole was allowed to stand at 40° C. for 72 hours. Then, color fading was visually observed.

○: practically, no problems arise
Δ: practically, problems hardly arise
x: practically, problems arise Example 14

Comparative Example 7

Heat-sensitive recording media were obtained in the same manner as in Example 13 except that a heat-sensitive recording medium (VI-a) and a heat-sensitive recording medium (VI-b) were obtained using the AA-PVA-based resin (VI) obtained in Example 6 at drying temperature of 40° C. and 60° C., respectively, and a heat-sensitive recording medium (VII-a) and a heat-sensitive recording medium (VII-b) were obtained using the AA-PVA-based resin (VII) obtained in Comparative Example 1 at drying temperature of 40° C. and 60° C., respectively. Evaluation was similarly carried out. The results are shown in Table 5.

TABLE 5

| | AA-introduced PVA | Heat-sensitive recording medium | Warm-water resistance | Plasticizer resistance |
|---|---|---|---|---|
| Example 13 | I | I-a | 0.93 | ○ |
| | | I-b | 0.98 | ○ |
| Example 14 | VI | VI-a | 0.90 | Δ |
| | | VI-b | 0.95 | ○ |
| Comparative Example 7 | VII | VII-a | 0.56 | X |
| | | VII-b | 0.85 | ○ |

Example 15

A solution of 15 parts of the AA-PVA-based resin (III) obtained in Example 3 dissolved in 85 parts of water was mixed with colloidal silica ["Ludox CL-P (cationic colloidal silica)" manufactured by W R Grace, particle size of 20 nm, solid matter content of 40%] so that a ratio of AA-PVA-based resin (III)/colloidal silica was 20/80 (weight ratio). Then, the mixture was stirred at 5000 rpm for 5 minutes in a homogenizer (T.K. ROBOMICS manufactured by Tokushukika Kogyo) to prepare a coating solution having a solid matter content of 25%.

Such an aqueous dispersion was coated onto a wood free paper having a basic weight of 270 g/m$^2$ by an applicator of 50 μm and was dried in a hot-air drying machine of 105° C. for 5 minutes to form a coated layer having a thickness of 7.5 μm, thereby an ink-jet recording medium being obtained.

Using the resulting ink-jet recording medium, the following evaluation was carried out. The results are shown in Table 6.

(Ink Absorbability)

Using a mixed solvent (water/diethylene glycol=7/3) as an ink model substance, an absorbed amount (ml/m$^2$) of the ink model substance at a contact time of 50 milliseconds was determined on the resulting ink-jet recording medium by means of an automatic scanning liquid absorptmeter "KM500win" (manufactured by Kumagai Riki Kogyo Co., Ltd.), thereby ink absorbability being evaluated.

(Glossiness)

Glossiness of the resulting ink-jet recording medium was measured at an angle of 60° toward the normal line of the sample surface using an gloss meter "VG-Σ80" (manufactured by Nippon Denshoku Industries, Co., Ltd.).

Example 16

Comparative Example 8

Evaluation was carried out in the same manner as in Example 15 except that the AA-PVA-based resin (IV) obtained in Example 4 and the AA-PVA-based resin (VIII) obtained in Comparative Example 2 were used.

TABLE 6

| | AA-introduced PVA | Ink absorbability | Glossiness |
|---|---|---|---|
| Example 15 | III | 6.8 | 158 |
| Example 16 | IV | 5.2 | 150 |
| Comparative Example 8 | VIII | 2.5 | 133 |

Example 17

Production of AA-PVA-Based Resin (IX)

The 1,2-diol-modified PVA-based resin (content of 1,2-diol structural unit of 3.0% by mol) obtained in Example 1 was charged into a kneader in an amount of 100 parts, then 7 parts of acetic acid was introduced thereto, thereby the resin being swollen. With stirring at a rotation number of 20 rpm, after temperature was elevated to 50° C., 24 parts of diketene was added dropwise over a period of 2 hours and the reaction was further continued for 30 minutes. After completion of the reaction, the resin was washed with 400 parts of methanol and then dried at 70° C. for 8 hours to obtain an AA-PVA-based resin (IX).

The AA-introduction degree of the resulting AA-PVA-based resin (IX) was 3.5% by mol, the content of sodium acetate was 0.05%, and the content of acetic acid was 0.07% (value of equation (7)=−0.28). Moreover, pH of a 4% aqueous solution of the AA-PVA-based resin was 4.4.

Figure 4:
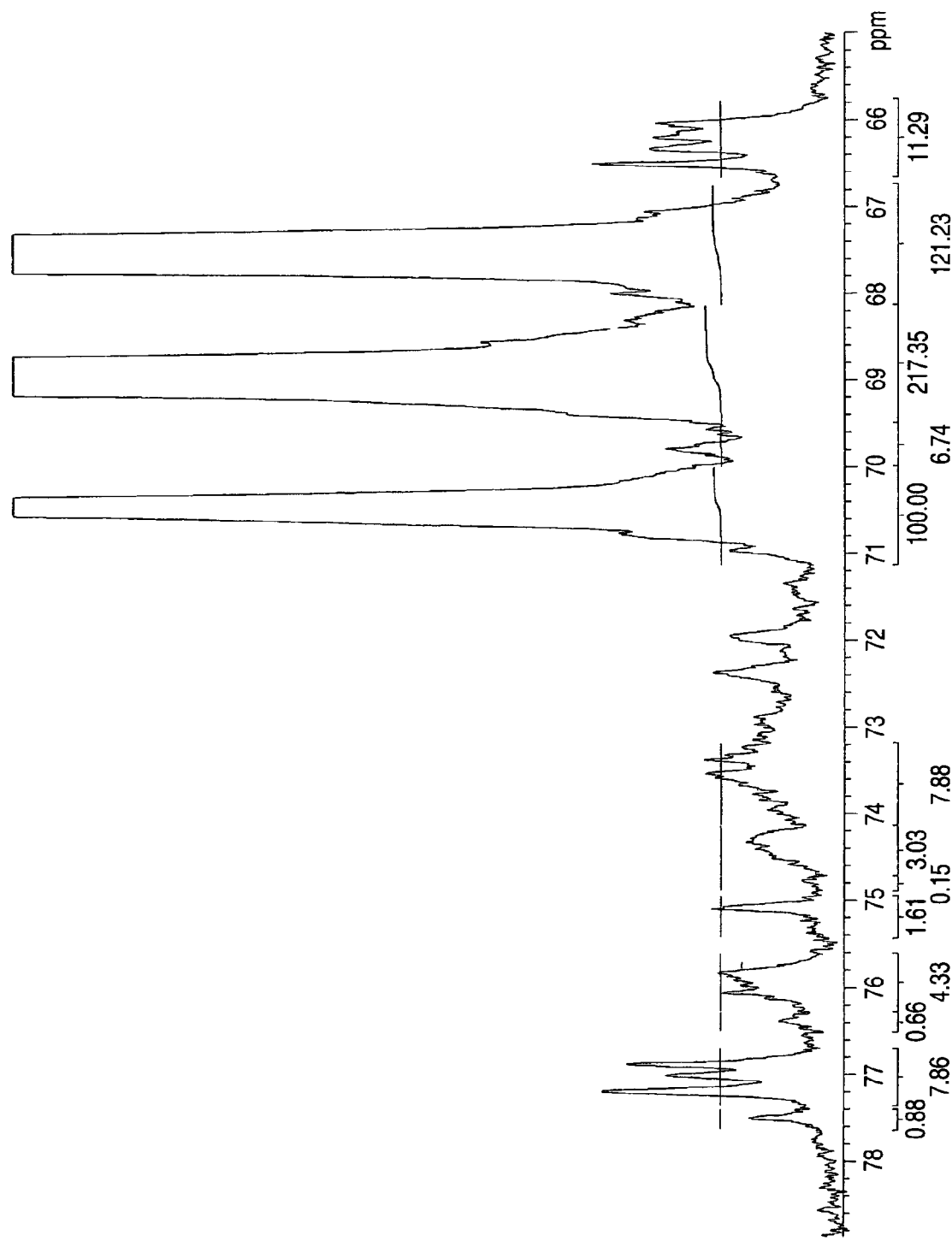
FIG. 4 is a $^{13}$C-NMR spectrum chart of the AA-PVA-based resin (IX).

A $^{13}$C-NMR spectrum chart (internal standard substance: Na trimethylsilylpropionate, solvent: D$_2$O) of the resulting AA-PVA-based resin (IX) is shown in FIG. 4. The AA-introduction degree of the main-chain hydroxyl group portion and the AA-PVA-based resin of the side-chain primary hydroxyl group portion were determined based on a peak area of the main-chain methine carbon to which the AA group was added and a peak area of the side-chain methylene carbon to which the AA group was added, which were determined from such a spectrum chart. Furthermore, reaction rate and reactivity ratio thereof were calculated. In this connection, any peak of the side-chain methine carbon to which the AA group was added was not confirmed. The results are shown in Table 7.

As seen from it, it is confirmed that the reactivity of AA-introduction toward the primary hydroxyl group of the side chain is about 20 times higher than that of the secondary hydroxyl group of the main chain.

TABLE 7

| | |
|---|---|
| AA-introduction degree of main-chain hydroxyl group portion (mol %) a × b/(b + c) | 2.17 |
| AA-introduction degree of side-chain primary hydroxyl group portion (mol %) a × c/(b + c) | 1.33 |
| Reaction rate (%) of main-chain hydroxyl group portion (mol %) (AA-introduction degree of main-chain hydroxyl group portion/ Amount of main-chain hydroxyl group) | 2.26 |
| Reaction rate (%) of side-chain primary hydroxyl group portion (mol %) (AA-introduction degree of side-chain primary hydroxyl group portion/Amount of side chain) | 44.33 |
| Reactivity ratio (Reaction rate of side-chain primary hydroxyl group portion/ Reaction rate of main-chain hydroxyl group portion) | 19.6 | a: Total AA-introduction degree = 3.0% by mol
b: Peak area of main-chain methine carbon to which AA group is added (74.7 to 73.2 ppm in $^{13}$C-NMR chart)
c: Peak area of side-chain methylene carbon to which AA group is added (70.0 to 69.5 ppm in $^{13}$C-NMR chart)
Amount of main-chain hydroxyl group = 96.2% by mol (calculated based on content of 1,2-diol structural unit and saponification degree)
Amount of side chain = 3.5% by mol (content of 1,2-diol structural unit)

While the invention has been described in detail and with reference to specific embodiments thereof, it will be apparent to one skilled in the art that various changes and modifications can be made therein without departing from the spirit and scope thereof.

The present application is based on Japanese Patent Application No. 2005-239251 filed on Aug. 22, 2005, and the contents are incorporated herein by reference.

INDUSTRIAL APPLICABILITY

The AA-PVA-based resin of the invention contains less amount of water-insoluble matter, is excellent in transparency when converted into an aqueous solution, and is excellent in viscosity stability of the aqueous solution even under severe conditions such as high concentration, high temperature, and long term, and water resistance is obtained by combined use of a crosslinking agent. Therefore, the resin is particularly useful for emulsifiers, suspending agents, adhesives, heat-sensitive recording media, ink-jet recording media, various binders, coating agents, paper processing agents, moldings, coating agents, photosensitizing agents, and thickeners.

The invention claimed is:

1. An acetoacetic ester group-containing polyvinyl alcohol-based resin having a structural unit represented by formula (1):

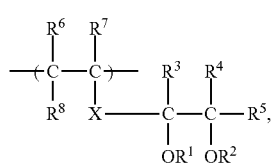
(1)

wherein $R^1$ and $R^2$ each represents a hydrogen atom or an acetoacetyl group and at least one of $R^1$ and $R^2$ represents an acetoacetyl group, $R^3$, $R^4$, $R^5$, $R^6$, $R^7$, x and $R^8$ each independently represents a hydrogen atom or an organic group, and X represents a single bond or a bonding chain.

2. The acetoacetic ester group-containing polyvinyl alcohol-based resin according to claim 1, wherein $R^1$ is a hydrogen atom and $R^2$ is an acetoacetyl group in the formula (1).

3. The acetoacetic ester group-containing polyvinyl alcohol-based resin according to claim 1, which is obtained by an acetoacetic esterification of a polyvinyl alcohol-based resin containing a structural unit represented by formula (3):

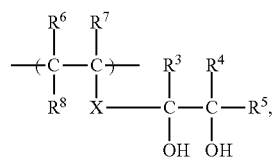
(3)

wherein $R^3$, $R^4$, $R^5$, $R^6$, $R^7$, and $R^8$ each independently represents a hydrogen atom or an organic group, and X represents a single bond or a bonding chain.

4. The acetoacetic ester group-containing polyvinyl alcohol-based resin according to claim 3, wherein the structural unit represented by formula (3) is obtained by a saponification of a copolymer of a vinyl ester-based monomer with a compound represented by formula (4):

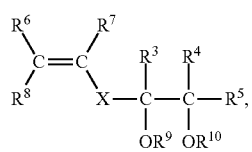
(4)

wherein $R^3$, $R^4$, $R^5$, $R^6$, $R^7$, and $R^8$ each independently represents a hydrogen atom or an organic group, X represents a single bond or a bonding chain, and $R^9$ and $R^{10}$ each independently represents a hydrogen atom or $R^{11}$—CO— (where $R^{11}$ is an alkyl group).

5. The acetoacetic ester group-containing polyvinyl alcohol-based resin according to claim 3, wherein the structural unit represented by formula (3) is obtained by a saponification and decarboxylation of a copolymer of a vinyl ester-based monomer with a compound represented by formula (5):

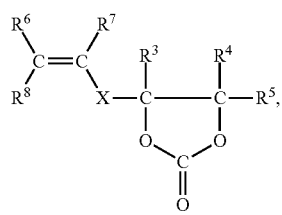
(5)

wherein $R^3$, $R^4$, $R^5$, $R^6$, $R^7$, and $R^8$ each independently represents a hydrogen atom or an organic group, and X represents a single bond or a bonding chain.

6. The acetoacetic ester group-containing polyvinyl alcohol-based resin according to claim 3, wherein the structural unit represented by formula (3) is obtained by saponification and deketalization of a copolymer of a vinyl ester-based monomer with a compound represented by formula (6):

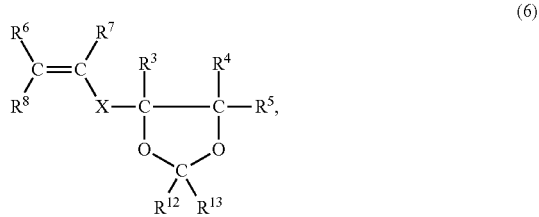

(6)

wherein $R^3$, $R^4$, $R^5$, $R^6$, $R^7$, $R^8$, $R^{12}$, and $R^{13}$ each independently represents a hydrogen atom or an organic group, and X represents a single bond or a bonding chain.

7. The acetoacetic ester group-containing polyvinyl alcohol-based resin according to claim 1, wherein X is either a single bond or —$CH_2OCH_2$—, and $R^3$, $R^4$, $R^5$, $R^6$, $R^7$, and $R^8$ are all hydrogen.

8. The acetoacetic ester group-containing polyvinyl alcohol-based resin according to claim 1, which comprises an acetate salt of an alkali metal and acetic acid so that a value obtained by following equation (7) is in a range of −2.27 to 1.77:

log [([acetate salt]×molecular weight of acetic acid)/ ([acetic acid]×molecular weight of acetate salt)]   (7), wherein the [acetate salt] represents a content (% by weight) of the acetate salt and the [acetic acid] represents a content (% by weight) of acetic acid.

9. An adhesive comprising the acetoacetic ester group-containing polyvinyl alcohol-based resin according to claim 1.

10. An acetoacetic ester group-containing polyvinyl alcohol-based resin having a structural unit represented by formula (1) and a structural unit represented by formula (2):

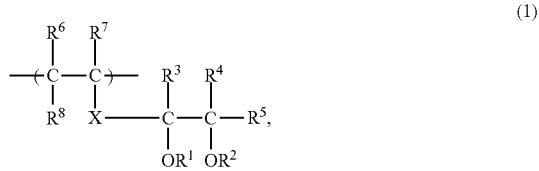

(1)

wherein $R^1$ and $R^2$ each represents a hydrogen atom or an acetoacetyl group, and at least one of $R^1$ and $R^2$ represents an acetoacetyl group, $R^3$, $R^4$, $R^5$, $R^6$, $R^7$, and $R^8$ each independently represents a hydrogen atom or an organic group, and X represents a single bond or a bonding chain:

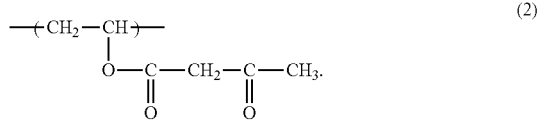

(2)

11. The acetoacetic ester group-containing polyvinyl alcohol-based resin according to claim 10, wherein $R^1$ is a hydrogen atom and $R^2$ is an acetoacetyl group in the formula (1).

12. The acetoacetic ester group-containing polyvinyl alcohol-based resin according to claim 10, which is obtained by an acetoacetic esterification of a polyvinyl alcohol-based resin containing a structural unit represented by formula (3):

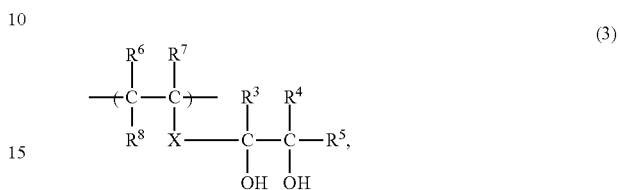

(3)

wherein $R^3$, $R^4$, $R^5$, $R^6$, $R^7$, and $R^8$ each independently represents a hydrogen atom or an organic group, and X represents a single bond or a bonding chain.

13. The acetoacetic ester group-containing polyvinyl alcohol-based resin according to claim 12, wherein the structural unit represented by formula (3), is obtained by a saponification of a copolymer of a vinyl ester-based monomer with a compound represented by formula (4):

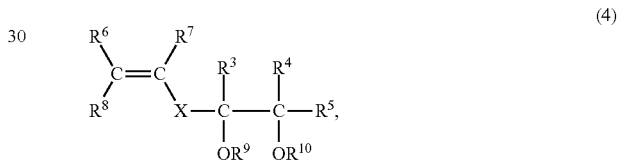

(4)

wherein $R^3$, $R^4$, $R^5$, $R^6$, $R^7$, and $R^8$ each independently represents a hydrogen atom or an organic group, X represents a single bond or a bonding chain, and $R^9$ and $R^{10}$ each independently represents a hydrogen atom or $R^{11}$—CO— (where $R^{11}$ is an alkyl group).

14. The acetoacetic ester group-containing polyvinyl alcohol-based resin according to claim 12, wherein the structural unit represented by formula (3), is obtained by a saponification and decarboxylation of a copolymer of a vinyl ester-based monomer with a compound represented by formula (5):

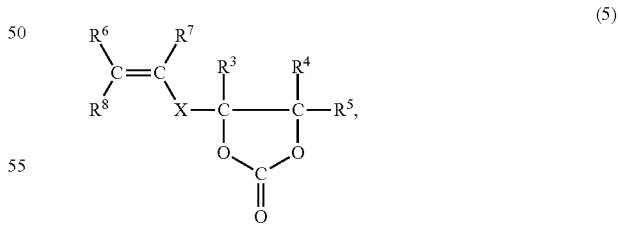

(5)

wherein $R^3$, $R^4$, $R^5$, $R^6$, $R^7$, and $R^8$ each independently represents a hydrogen atom or an organic group, and X represents a single bond or a bonding chain.

15. The acetoacetic ester group-containing polyvinyl alcohol-based resin according to claim 12, wherein the structural unit represented by formula (3), is obtained by saponification and deketalization of a copolymer of a vinyl ester-based monomer with a compound represented by formula (6):

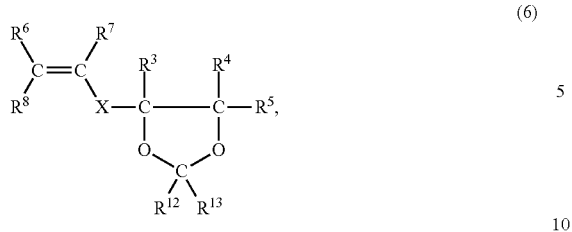 (6)

wherein $R^3$, $R^4$, $R^5$, $R^6$, $R^7$, $R^8$, $R^{12}$, and $R^{13}$ each represents a hydrogen atom or an organic group, and X represents a single bond or a bonding chain.

16. The acetoacetic ester group-containing polyvinyl alcohol-based resin according to claim 10, wherein X is either a single bond or —$CH_2OCH_2$—, and $R^3$, $R^4$, $R^5$, $R^6$, $R^7$, and $R^8$ are all hydrogen.

17. The acetoacetic ester group-containing polyvinyl alcohol-based resin according to claim 10, which comprises an acetate salt of an alkali metal and acetic acid so that a value obtained by a following equation (7) is in a range of −2.27 to 1.77:

$$\log [([\text{acetate salt}] \times \text{molecular weight of acetic acid}) / ([\text{acetic acid}] \times \text{molecular weight of acetate salt})] \quad (7),$$

wherein the [acetate salt] represents a content (% by weight) of the acetate salt and the [acetic acid] represents a content (% by weight) of acetic acid.

18. An adhesive comprising the acetoacetic ester group-containing polyvinyl alcohol-based resin according to claim 10.

* * * * *